(12) United States Patent
Sakikawa

(10) Patent No.: US 7,497,081 B2
(45) Date of Patent: Mar. 3, 2009

(54) HYDRAULIC FLUID SUPPLY STRUCTURE

(75) Inventor: Shigenori Sakikawa, Hyogo (JP)

(73) Assignee: Kanzaki Kokyukoki Mfg. Co., Ltd., Hyogo (JP)

(*) Notice: Subject to any disclaimer, the term of this patent is extended or adjusted under 35 U.S.C. 154(b) by 0 days.

(21) Appl. No.: 11/611,580

(22) Filed: Dec. 15, 2006

(65) Prior Publication Data

US 2007/0137972 A1 Jun. 21, 2007

(30) Foreign Application Priority Data

Dec. 16, 2005 (JP) .............................. 2005-362994

(51) Int. Cl.
*F16D 31/02* (2006.01)
(52) U.S. Cl. .......................................... 60/422; 60/435
(58) Field of Classification Search ................... 60/421, 60/422, 435, 441
See application file for complete search history.

(56) References Cited

U.S. PATENT DOCUMENTS 5,069,037 A * 12/1991 Sakigawa et al. ............. 60/435
5,289,680 A * 3/1994 Obe et al. ..................... 60/422
5,542,307 A * 8/1996 Hasegawa et al. .......... 74/15.63

FOREIGN PATENT DOCUMENTS

JP 2005-001636 1/2005

* cited by examiner

Primary Examiner—F. Daniel Lopez
(74) Attorney, Agent, or Firm—Sterne, Kessler, Goldstein & Fox PLLC

(57) ABSTRACT

There is provided a hydraulic fluid supply structure including: a discharge line fluidly connected to a discharge port of a hydraulic pump body and regulated to have a first pressure value; an external hydraulic fluid extraction line for supplying the hydraulic fluid to an actuator for raising and lowering a working machine, the external hydraulic fluid extraction line being fluidly connected to the discharge line through a resistance valve; a PTO hydraulic fluid line for supplying the hydraulic fluid to a hydraulic operating type clutch mechanism for engaging or disengaging power transmission to the working machine, the PTO hydraulic line being fluidly connected to the discharge line through a throttle valve and regulated to have a second pressure value lower than the first pressure value; and a PTO switching valve interposed in the PTO hydraulic fluid line so as to turn ON/OFF the supply of the hydraulic fluid to the hydraulic clutch mechanism. The PTO switching valve is configured to block a primary side line, out of the PTO hydraulic line, positioned on the upstream side from the PTO switching valve, when the supply of hydraulic fluid to the hydraulic clutch mechanism is turned OFF.

8 Claims, 13 Drawing Sheets

HYDRAULIC FLUID SUPPLY STRUCTURE

BACKGROUND OF THE INVENTION

1. Field of the Invention

The present invention relates to a hydraulic fluid supply structure configured to supply pressurized fluid from a hydraulic pump to a hydraulic clutch mechanism for engaging and disengaging power transmission to a working machine, and to a raising and lowering hydraulic actuator for raising and lowering the working machine.

2. Related Art

It is conventionally known to supply pressurized fluid from a single hydraulic pump to a hydraulic operating type clutch mechanism for engaging and disengaging power transmission to a working machine, and to a raising and lowering hydraulic actuator for raising and lowering the working machine (see e.g., Japanese Laid-Open Patent Publication No. 2005-1636).

Such conventional hydraulic fluid supply structure allows the hydraulic fluid sources of the hydraulic clutch mechanism and the hydraulic actuator to be common; thereby it is effective in reducing cost and realizing miniaturization.

However, the conventional hydraulic fluid supply structure has a drawback in that the raising speed of the working machine by the hydraulic actuator cannot be increased.

Specifically, the hydraulic fluid supply structure has an external hydraulic fluid extraction line for supplying the hydraulic fluid to the hydraulic actuator and a PTO hydraulic fluid line for supplying the hydraulic fluid to the hydraulic operating type clutch mechanism, the external hydraulic fluid extraction line being fluidly connected to a discharge line of the hydraulic pump through a resistance valve, the PTO hydraulic fluid line being fluidly connected to the discharge line through a throttle valve or an orifice.

The hydraulic fluid supply structure has a PTO switching valve interposed in the PTO hydraulic fluid line, wherein the supply of the hydraulic fluid to the hydraulic clutch mechanism is on-off controlled by the PTO switching valve.

Specifically, the conventional configuration is configured so that the PTO hydraulic fluid line fluidly connects to a drain line when the PTO switching valve turns OFF the supply of hydraulic fluid to the hydraulic clutch mechanism.

That is, in the conventional configuration, the PTO hydraulic fluid line is opened to the drain line, when the hydraulic fluid supply to the hydraulic clutch mechanism is stopped so that the hydraulic clutch mechanism is in a disengaging state.

In the conventional configuration, the power transmission to the working machine is normally disengaged (i.e., supply of hydraulic fluid to the hydraulic clutch mechanism is stopped) in view of safety and the like, when raising the working machine by the hydraulic actuator. The PTO hydraulic line is opened to the outside in the conventional configuration as described above, when supply of hydraulic fluid to the hydraulic clutch mechanism is stopped. Therefore, some of the pressurized fluid is constantly leaked out from the discharge line through the drain line.

Therefore, it takes time to increase the amount of fluid and raise the hydraulic pressure in the external hydraulic fluid extraction line, whereby a great amount of time is required in the raising operation of the working machine.

SUMMARY OF THE INVENTION

The present invention, in view of the prior art, aims to provide a hydraulic fluid supply structure configured to supply pressurized fluid from a hydraulic pump to a hydraulic clutch mechanism for engaging and disengaging power transmission to a working machine, and to supply the same to a raising and lowering hydraulic actuator for raising and lowering the working machine, the hydraulic fluid supply structure allowing the working machine to be raised by the hydraulic actuator in a state where the power transmission to the working machine is disengaged while having a simple configuration.

The present invention also aims to provide a hydraulic fluid supply structure with a simple configuration capable of preventing unnecessary high pressure from generating in the PTO hydraulic fluid line while achieving the first aim.

According to the present invention, there is provided a hydraulic fluid supply structure including: a discharge line fluidly connected to a discharge port of a hydraulic pump body and regulated to have a first pressure value; an external hydraulic fluid extraction line for supplying the hydraulic fluid to a raising and lowering hydraulic actuator for raising and lowering a working machine, the external hydraulic fluid extraction line being fluidly connected to the discharge line through a resistance valve; a PTO hydraulic fluid line for supplying the hydraulic fluid to a hydraulic operating type clutch mechanism for engaging or disengaging power transmission to the working machine, the PTO hydraulic line being fluidly connected to the discharge line through a throttle valve and regulated to have a second pressure value lower than the first pressure value; and a PTO switching valve interposed in the PTO hydraulic fluid line so as to turn ON/OFF the supply of the hydraulic fluid to the hydraulic clutch mechanism. The PTO switching valve is configured to block a primary side line, out of the PTO hydraulic line, positioned on the upstream side from the PTO switching valve, when the supply of hydraulic fluid to the hydraulic clutch mechanism is turned OFF.

With the hydraulic fluid supply structure according to the present invention, it is possible to efficiently supply the pressurized fluid to the external hydraulic fluid extraction line when the working machine is raised by the hydraulic actuator in a state where the power transmission to the working machine is disengaged, whereby it can be rapidly performed to raise the working machine.

Further, in the above configuration, since the pressurized fluid from the auxiliary hydraulic pump body does not flow outside from the PTO hydraulic fluid line in the raising operation of the working machine, it is possible to reduce the load of the hydraulic pump body.

Preferably, the PTO hydraulic fluid line may be fluidly disconnected to the discharge line when the hydraulic pressure of the discharge line becomes higher than a third pressure value, which is lower than the first pressure value and higher than the second pressure value.

With the configuration, it is possible to effectively prevent unnecessary high pressure to be occurred in the PTO hydraulic fluid line when raising the working machine. Accordingly, it is possible to prevent the hydraulic fluid from being leaked outside from the PTO hydraulic fluid line without a high precision sealing configuration.

In one embodiment, the hydraulic fluid supply structure preferably further includes a cut-off valve interposed in the PTO hydraulic fluid line. The cut-off valve may be configured to cause the PTO hydraulic fluid line to be communicated or cut off, with the hydraulic pressure of the discharge line as a direct or indirect pilot pressure.

Preferably, the discharge line includes a discharge fluid passage formed in a hydraulic pump case which surrounds the hydraulic pump body. The PTO hydraulic fluid line includes a plurality of PTO fluid passages respectively formed in a plurality of case members including the hydraulic pump case, the plurality of PTO fluid passages being fluidly connected to each other in series. The plurality of PTO fluid passages include one PTO fluid passage which is formed in the hydraulic pump case so as to have a proximal end fluidly connected to the discharge fluid passage and in which the throttle valve is interposed, and another PTO fluid passage formed in another case member separate from the hydraulic pump case, the another PTO fluid passage being fluidly connected to the one PTO fluid passage directly or indirectly, and being configured so that the PTO switching valve is interposed therein. The cut-off valve is mounted at the hydraulic pump case so as to be positioned on a secondary side of the throttle valve.

More preferably, the cut-off valve operates with the hydraulic pressure between the throttle valve and the cut-off valve as the pilot pressure.

In another embodiment, the throttle valve causes the PTO hydraulic fluid line to be communicated when the hydraulic pressure of the discharge line is lower than or equal to a third pressure value which is lower than the first pressure value and higher than the second pressure value, and causes an upstream portion, out of the PTO hydraulic fluid line, positioned on an upstream side from the throttle valve to be blocked when the hydraulic pressure of the discharge line becomes higher than the third pressure value.

Preferably, the discharge line includes a discharge fluid passage formed in a hydraulic pump case which surrounds the hydraulic pump body. The PTO hydraulic fluid line includes plurality of PTO fluid passages respectively formed in plurality of case members including the hydraulic pump case, the plurality of PTO fluid passages being fluidly connected to each other in series. The plurality of PTO fluid passages include one PTO fluid passage formed in the hydraulic pump case so as to have a proximal end fluidly connected to the discharge fluid passage, and another PTO fluid passage formed in another case member separate from the hydraulic pump case, the another PTO fluid passage being fluidly connected to the one PTO fluid passage directly or indirectly, and being configured so that the PTO switching valve is interposed therein. The throttle valve is mounted at the hydraulic pump case so as to be interposed in the one PTO fluid passage.

More preferably, the throttle valve operates with the hydraulic pressure of the upstream side of the throttle valve as the pilot pressure.

In the above various configurations, the hydraulic fluid supply structure preferably further includes a charge line for replenishing the hydraulic fluid to a closed circuit of an HST, the charge line being fluidly connected to the discharge line through a pressure reducing valve.

With the configuration, it is possible to replenish the hydraulic fluid to the HST without providing an additional hydraulic pump.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Embodiment 1

The preferred embodiment of a hydraulic fluid supply structure according to the present invention will now be described with reference to the accompanying drawings.

In the present embodiment, a case in which one embodiment of the hydraulic fluid supply structure according to the present invention is applied to a tandem pump unit will be described as an example.

Figure 1:
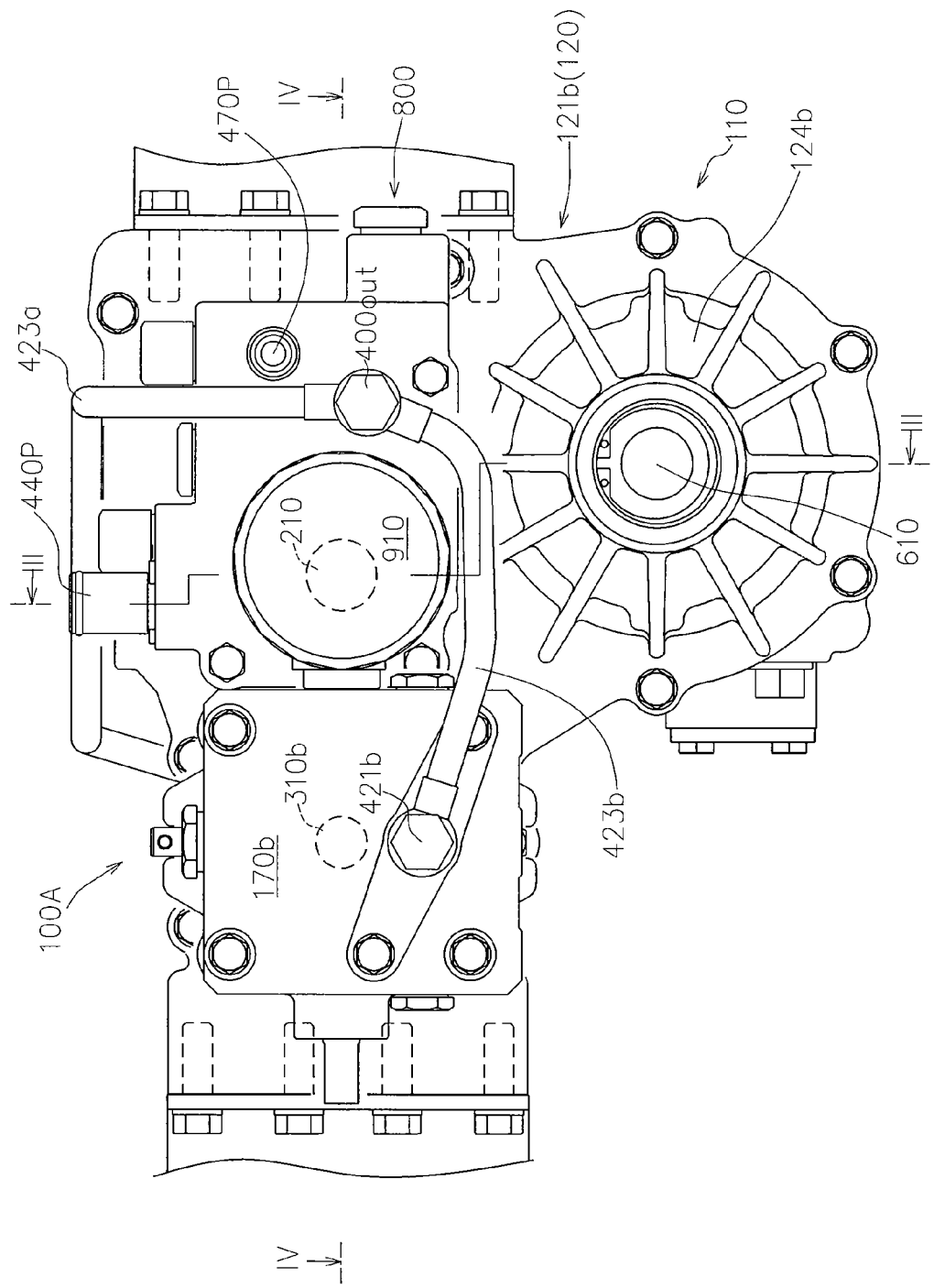
FIG. 1 is a front view of a pump unit to which the hydraulic fluid supply structure according to the first embodiment is applied.
Figure 2:
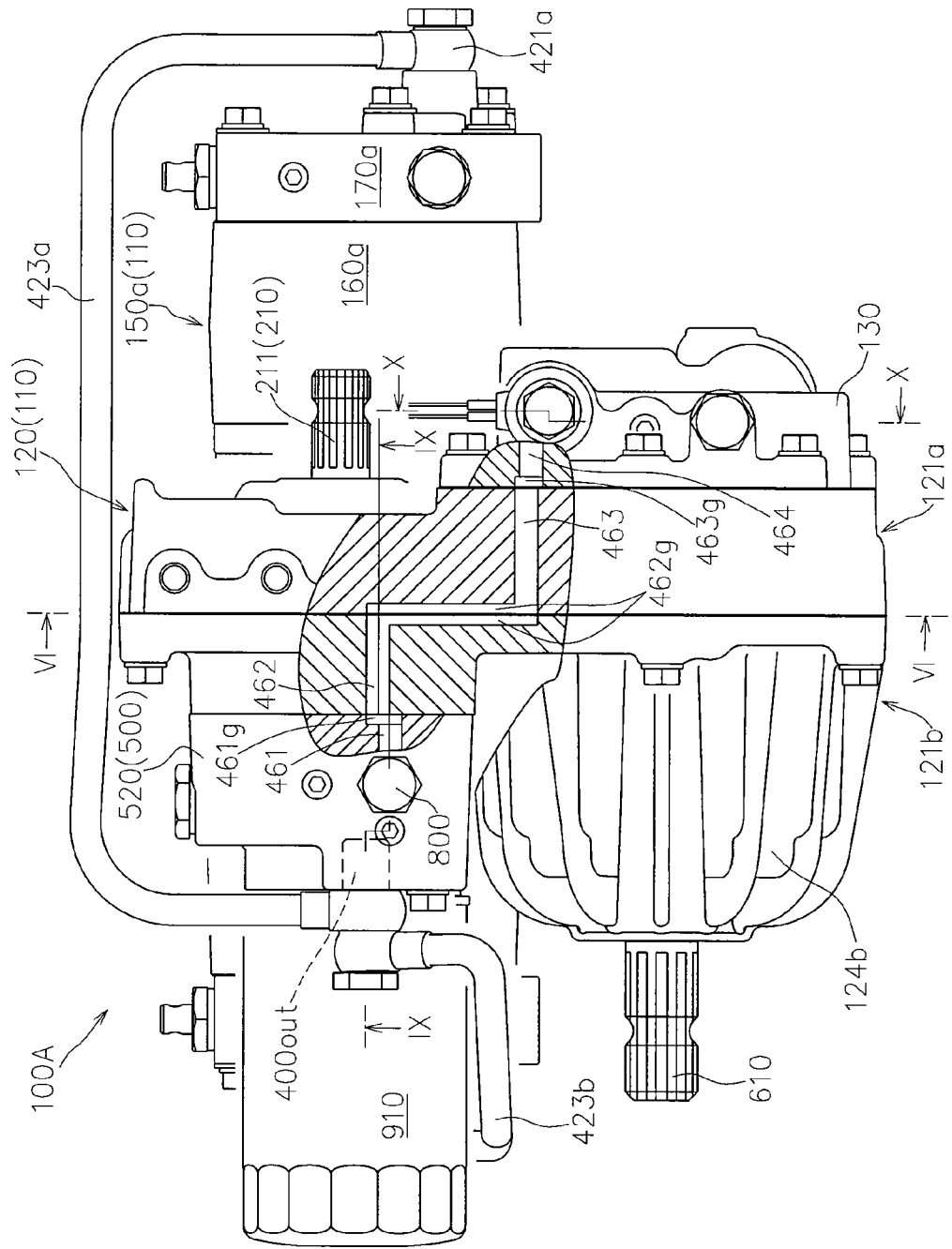
FIG. 2 is a side view of the pump unit shown in FIG. 1.

FIGS. 1 and 2 are front view and side view, respectively, of a pump unit 100A to which the hydraulic fluid supply structure according to the present embodiment is applied.

Figure 3:
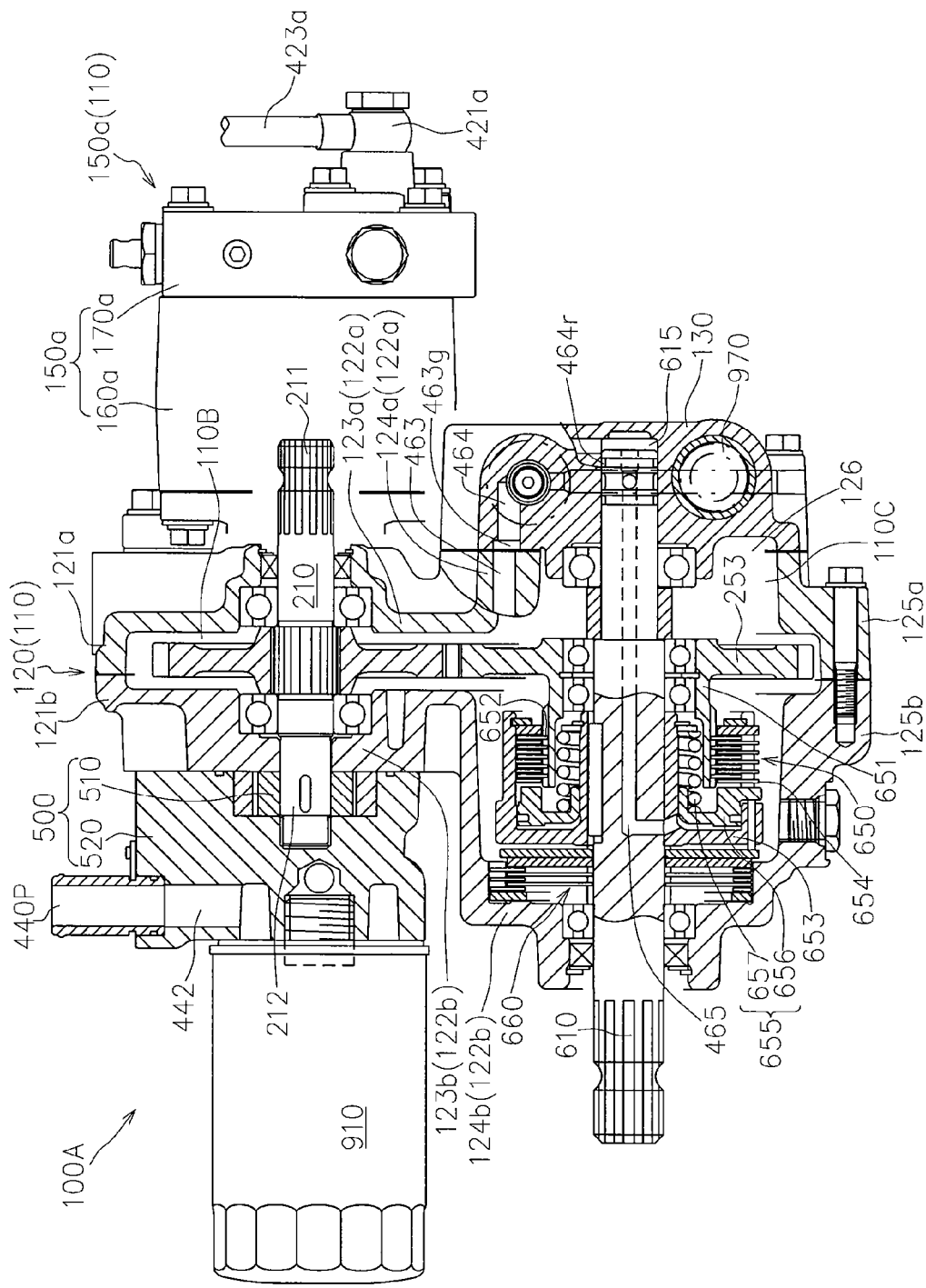
FIG. 3 is a vertical cross sectional side view of the pump unit taken along line III-III in FIG. 1.
Figure 4:
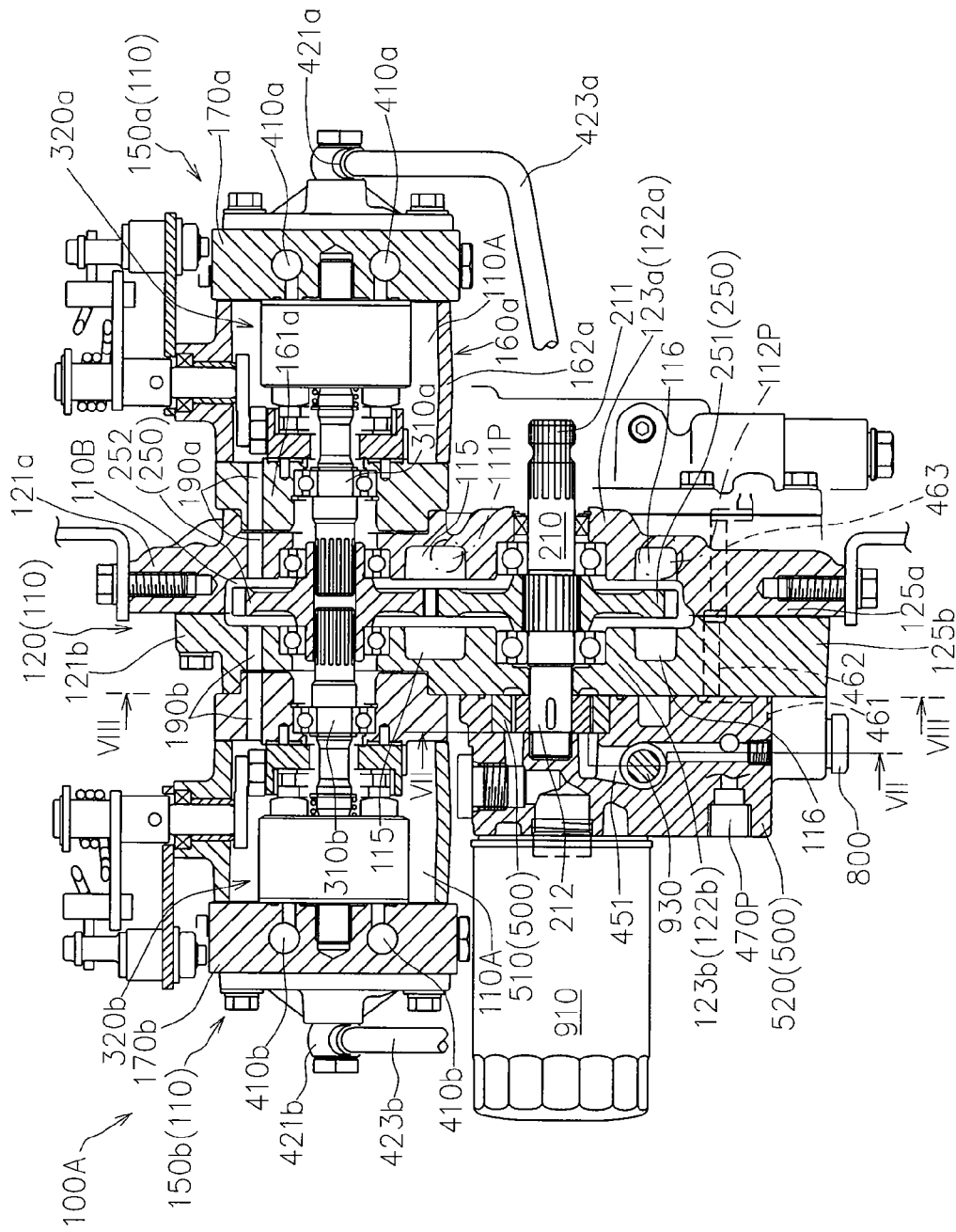
FIG. 4 is a traverse cross sectional plan view of the pump unit taken along line IV-IV in FIG. 1.

FIGS. 3 and 4 are vertical cross sectional side view and traverse cross sectional plan view, respectively, of the pump unit taken along line III-III and line IV-IV in FIG. 1.

Figure 5:
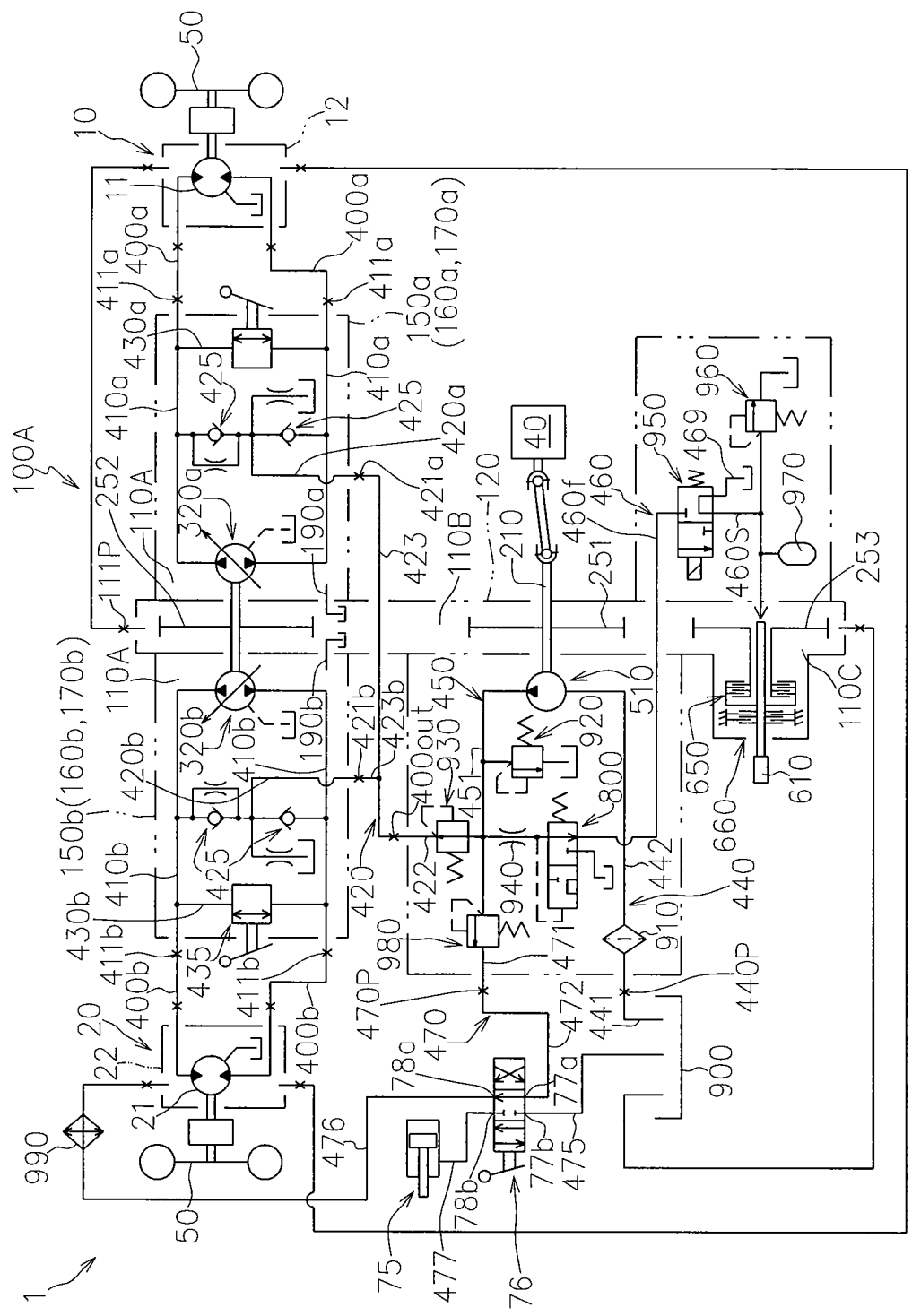
FIG. 5 is a hydraulic circuit diagram of a working vehicle to which the pump unit shown in FIGS. 1-4 is applied.

FIG. 5 is a hydraulic circuit diagram of a working vehicle 1 applied with the pump unit 100A.

As shown in FIG. 5, the pump unit 100A forms a traveling system speed change transmission mechanism in cooperation with a pair of first and second hydraulic motor units 10, 20 arranged in the working vehicle 1, and also forms a part of a PTO system transmission mechanism for transmitting a driving force to a working vehicle (e.g., a mower device) arranged in the working vehicle 1.

The working machine is coupled to a vehicle frame in the working vehicle in a elevating manner, and is raised and lowered by a hydraulic actuator 75 (e.g., raising and lowering hydraulic cylinder), which operates with the pressurized fluid from an auxiliary hydraulic pump unit 500 to be hereinafter described as the hydraulic fluid.

The hydraulic fluid supply structure according to the present embodiment is configured so as to supply the pressurized fluid from the auxiliary hydraulic pump body 510 operatively driven by a driving power source 40 arranged in the working machine 1 to an undermentioned PTO hydraulic clutch mechanism 650 interposed in the PTO system transmission mechanism, and also to the hydraulic actuator 75.

The pump unit 100A, which is one example applied with the hydraulic fluid supply structure according to the present embodiment, will be described first.

As shown in FIGS. 1 to 5, the pump unit 100A includes a housing 110 supported at a supporting member such as a vehicle frame in the working vehicle 1; an input shaft 210 having one end supported by the housing 110 so that its first end forms an input end operatively connected to the driving power source 40; first and second pump shafts 310a, 310b supported at the housing 110; first and second pump main bodies 320a, 320b accommodated in the housing 110, the first and second pump main bodies 320a, 320b being driven by the first and second shafts 310a, 310b, respectively; a PTO shaft 610 supported at the housing 110; a power transmission gear train 250 for transmitting power from the input shaft 210 to the first pump shaft 310a, the second pump shaft 310b and the PTO shaft 610, the power transmission gear train 250 being accommodated in the housing 110; a PTO hydraulic clutch mechanism 650 accommodated in the housing 110 so as to be interposed in the power transmission path from the input shaft 210 to the PTO shaft 610; and the auxiliary hydraulic pump unit 500 operatively driven by the driving power source 40.

The housing 110 is configured to accommodate the hydraulic pump main bodies 320a, 320b, the power transmission gear train 250, and the PTO hydraulic clutch mechanism 650, and to have the internal space used as a fluid reservoir.

Specifically, the housing 110 includes a pump accommodating space 110A for accommodating the first and second hydraulic pump main bodies 320a, 320b; a gear accommodating space 110B for surrounding a region including an engaging point T of undermentioned first and second transmission gears 251, 252 configuring the power transmission gear train 250; a PTO clutch accommodating space 110C for accommodating the PTO clutch mechanism 650, the PTO clutch accommodating space 110C being fluidly connected to the gear accommodating space 110B to allow the fluid to freely flow therebetween; and a pair of first and second suction/discharge ports 111P, 112P for opening the internal space to the outside, as shown in FIGS. 3 and 4.

In the present embodiment, the housing 110 includes a base housing 120 for defining the gear accommodating space 110B and the PTO clutch accommodating space 110C, the base housing 120 being provided with the first and second suction/discharge ports 111P, 112P; and a pump case 150 detachably connected to the base housing 120, the pump case 150 defining the pump accommodating space 110A, as shown in FIGS. 3 and 4.

The base housing 120 includes first and second housing portions 121a, 121b detachable connected to each other so as to form the gear accommodating space 110B and the PTO clutch accommodating space 110C.

Specifically, the first housing portion 121a includes a first end wall 122a configured so as to support the input shaft 210, and a first peripheral wall 125a extending from the peripheral edge of the first end wall 122a towards the downstream side in the transmitting direction (towards front of vehicle in the embodiment shown) of the input shaft 210.

The second housing portion 121b includes a second end wall 122b configured so as to support the input shaft 210, and a second peripheral wall 125b extending from the peripheral edge of the second end wall 122b towards the upstream side in the transmitting direction (towards rear of vehicle in the embodiment shown) of the input shaft 210.

The base housing 120 is configured so that the gear accommodating space 110B and the PTO clutch accommodating space 110C are formed by connecting the first and second housing portions 121a, 121b to each other with the end face of the first peripheral wall 125a and the end face of the second peripheral wall 125b being contacted to each other.

More specifically, the first end wall 122a includes a first gear accommodating region 123a for defining the gear accommodating space 110B, and a first PTO clutch accommodating region 124a for defining the PTO clutch accommodating space 110C, as shown in FIGS. 3 and 4.

The first PTO clutch accommodating region 124a projects outward from the first gear accommodating region 123a towards the upstream side in the transmitting direction of the input shaft 210.

Similarly, the second end wall 122b includes a second gear accommodating region 123b for defining the gear accommodating space 110B, and a second PTO clutch accommodating region 124b for defining the PTO clutch accommodating space 110C (see FIGS. 3 and 4).

The second PTO clutch accommodating region 124b projects outward from the second gear accommodating region 123b towards the downstream side in the transmitting direction of the input shaft 210.

The first and second gear accommodating regions 123a, 123b are configured so as to extend substantially parallel to each other in a state of being close to each other when the first and second housing portions 121a, 121b are connected, so that the gear accommodating space 110B having a narrow width is defined.

The first and second PTO clutch regions 124a, 124b are spaced apart to each other so that the PTO clutch accommodating space 110C for accommodating the PTO clutch mechanism 650 is defined in between.

The first PTO clutch region 124a is provided with an opening 126, which is liquid tightly sealed by a lid member 130 that forms a liquid tight seal and is detachably connected to the first end wall, as shown in FIG. 3.

The configuration of the pump case 150 will be hereinafter described.

The auxiliary hydraulic pump unit 500 includes an auxiliary hydraulic pump body 510 driven by the driving force from the driving power source 40.

In the present embodiment, the auxiliary hydraulic pump body 510 is operatively driven by the input shaft 210, as shown in FIGS. 3 and 4.

Specifically, in the present embodiment, the input shaft 210 has a first end 211, which forms the input end, supported at the first end wall 122a in a state of projecting outward and a second end 212 supported at the second end wall 122b in a state of extending outward, as shown in FIGS. 3 and 4.

The auxiliary hydraulic pump body 510 is configured so as to be driven by the second end 212 of the input shaft 210.

In addition to the auxiliary hydraulic pump body 510, the auxiliary hydraulic pump unit 500 includes an auxiliary hydraulic pump case 520 connected to the second end wall 122b so as to surround the auxiliary hydraulic pump body 510.

The auxiliary hydraulic pump body 510 is configured so as to be driven by the input shaft 210 in the present embodiment, but in place thereof, the auxiliary hydraulic pump body 510 may be configured so as to be driven by one of the first or the second pump shaft 310a, 310b.

Furthermore, the pump unit 100A illustrated in the present embodiment includes the input shaft 210, which is a separate body from the first and second pump shafts 310a, 310b, and the auxiliary hydraulic pump body 510 is configured so as to be driven by the input shaft 210, but the hydraulic fluid supply structure according to the present invention is not limited to the configuration.

For example, in a case where a pump unit is configured so that one of the first or the second pump shaft 310a, 310b is commonly used as the input shaft 210, the auxiliary hydraulic pump body 510 may be configured so as to be driven by one of either the first or the second pump shaft 310a, 310b.

The first and second pump shafts 310*a*, 310*b* are supported at the housing 110 in a state of being operatively connected to the input shaft 210 by way of the power transmission gear train 250.

In the present embodiment, the power transmission gear train 250 includes the first transmission gear 251 supported in a relatively non-rotatable manner at the input shaft 210; and the second transmission gear 252 engaging with the first transmission gear 251, the second transmission gear 252 being supported in a relatively non-rotatable manner at both the first and second pump shafts 310*a*, 310*b*, as shown in FIGS. 3 to 5.

In other words, in the pump unit 100A illustrated in the present embodiment, the first and second pump shafts 310*a*, 310*b* are supported at the base housing 120 so as to be coaxially positioned to each other, as shown in FIG. 4.

Specifically, the first pump shaft 310*a* is supported at the first housing portion 121*a* so as to have a proximal end positioned in the gear accommodating space 110B and a distal end extended outward.

The second pump shaft 310*b* is supported at the second housing portion 121*b* so as to have a proximal end positioned in the gear accommodating space 110B and a distal end extended outward toward the side opposite the first pump shaft 310*a*.

The second transmission gear 252 is supported in a relatively non-rotatable manner at both the proximal ends of the first and second pump shafts 310*a*, 310*b*.

The first and second hydraulic pump main bodies 320*a*, 320*b* are respectively driven by the outwardly extended part of the first and second pump shafts 310*a*, 310*b*.

In other words, in the pump unit 100A illustrated in the present embodiment, the first and second hydraulic pump main bodies 320*a*, 320*b* are respectively arranged on one side (rear side of vehicle in the embodiment shown) and the other side (front side of vehicle in the embodiment shown) with the base housing 120 in between.

As shown in FIG. 5, the first hydraulic pump body 320*a* is fluidly connected to a first hydraulic motor main body 11 in the first motor unit 10 by way of a pair of first hydraulic fluid lines 400*a*.

At least one of either the first hydraulic pump body 320*a* or the first hydraulic motor main body 11 is of a variable displacement type so as to form a first HST that drives one of a pair of driving wheels 50 with variable speeds.

Similarly, the second hydraulic pump body 320*b* is fluidly connected to a second hydraulic motor main body 21 in the second motor unit 20 by way of a pair of second hydraulic fluid lines 400*b*.

At least one of either the second hydraulic pump body 320*b* or the second hydraulic motor main body 21 is of a variable displacement type so as to form a second HST that drives the other one of the pair of driving wheels 50 with variable speeds.

In the present embodiment, the first and second hydraulic pump main bodies 320*a*, 320*b* are of a variable displacement type, and the first and second hydraulic motor main bodies 11, 21 are of a fixed displacement type.

The first hydraulic pump body 320*a* includes a piston unit that reciprocates according to the rotation of the first pump shaft 310*a*, and a cylinder block for supporting the piston unit in a reciprocating manner.

As described above, the first hydraulic pump body 320*a* is of a variable displacement type in the present embodiment.

Therefore, the first pump body 320*a* includes, in addition to the above configuration, an output-adjusting member for adjusting the suction/discharge rate by changing the sliding range of the piston unit.

A movable swash plate is used as the output-adjusting member, and a shoe arranged at the distal end of the piston unit is contacted to the movable swash plate in the present embodiment.

The output-adjusting member is externally operable by a control shaft. A trunnion shaft linked to the output-adjusting member by way of an arm is used as the control shaft in the present embodiment.

The second hydraulic main body 320*b* has substantially the same configuration as the first hydraulic pump body 320*a*.

The pump case 150 will now be described.

As shown in FIGS. 2 and 4, the pump unit 100A according to the present embodiment includes, as the pump case 150*a*, first pump case 150*a* for surrounding the first hydraulic pump body 320*a* and a second pump case 150*b* for surrounding the second hydraulic pump body 320*b*.

The first and second hydraulic pump main bodies 320*a*, 320*b* are arranged so that the base housing 120 is positioned between them, as described above.

Therefore, the first and second pump cases 150*a*, 150*b* are respectively connected to one side and the other side of the base housing 120.

Specifically, the first pump case 150*a* includes a first case body 160*a* which has a proximal end connected to the first end wall 122*a* and a distal end forming an opening through which the first hydraulic pump body 320*a* can be inserted; and a first port block 170*a* detachably connected to the first case body 160*a* so as to form a liquid tight seal on the opening of the first case body 160*a*, as shown in FIG. 4.

Other than being connected to the second end wall 122*b*, the second pump case 150*b* has substantially the same configuration as the first pump case 150*a*. Therefore, in the figure, the same reference characters are denoted with suffix "b" in place of "a" for the same members of the second pump case 150*b* as those of the first pump case 150*a*, and the detailed explanations thereof are omitted.

The first case body 160*a* includes an end face part 161*a* connected to the first end wall 122*a*, and a peripheral wall part 162*a* extending from the peripheral edge of the end face part 161*a* in the direction of the pump shaft so as to surround the first hydraulic pump body 320*a*, the free end side of the peripheral wall part 162*a* being provided with the opening.

The end face part 161*a* and the peripheral wall part 162*a* are separate bodies from each other in the present embodiment (see FIG. 4), but may obviously be integrally formed.

The first port block 170*a* is formed with a pair of first hydraulic fluid passages 410*a* configuring a part of the pair of first hydraulic fluid lines 400*a*, as shown in FIG. 4.

Each of the pair of first hydraulic fluid passages 410*a* has a first end fluidly connected to the first hydraulic pump body 320*a* by way of a kidney port arranged at the first port block 170*a*, and a second end opened to the external surface of the first port block 170*a* so as to form a first hydraulic fluid port 411*a* (see FIG. 5).

Furthermore, the first port block 170*a* is formed with a first charge fluid passage 420*a* for guiding the charge fluid, which has been sent from the auxiliary hydraulic pump unit 500, to the pair of first hydraulic fluid passages 410*a*, and a first by-pass fluid passage 430*a* for communicating between the pair of first hydraulic fluid passages 410*a*, as shown in FIG. 5.

The first charge fluid passage 420*a* has a first end opened to the external surface of the first port block 170*a* so as to form a first charge port 421*a* and a second end fluidly connected to each of the pair of first hydraulic fluid passages 410*a* by way of a check valve 425.

In the present embodiment, the first charge port 421*a* is arranged at the end face on the side opposite the connecting surface with the first case body 160*a*, out of the external surface of the first port block 170*a*, as shown in FIGS. 3 and 4.

The first by-pass fluid passage 430*a* has a first end opened to one side surface (one side surface orthogonal to the end face) of the first port block 170*a*. Through the first end, an externally operable switching valve 435 for communicating/cutting off the first by-pass fluid passage 430*a* is inserted into the first by-pass fluid passage 430*a*.

As shown in FIG. 3, the PTO shaft 610 is supported in a rotatable manner about the axis line by the first PTO clutch accommodating region 124*a* in the first end wall 122*a* and the second PTO clutch accommodating region 124*b* in the second end wall 122*b*.

In the present embodiment, the PTO shaft 610 has a first end (a rear end in the embodiment) supported by the lid member 130 to form a liquid tight seal on the opening arranged in the PTO clutch region 124*a*, and a second end (a front end in the embodiment) supported by the second PTO clutch accommodating region 124*b*.

The PTO hydraulic clutch mechanism 650 is configured to selectively engage/disengage the power transmission from the driving power source 40 to the PTO shaft 610.

Specifically, the PTO hydraulic clutch mechanism 650 is of a hydraulic operating type in which the power transmission is engaged at a time of receiving the supply of pressurized fluid from the auxiliary hydraulic pump body 510 and the power transmission is disengaged when the supply of pressurized fluid from the auxiliary hydraulic pump body 510 is stopped.

In the present embodiment, the PTO hydraulic clutch mechanism 650 is accommodated in the clutch accommodating space 110C in a state of being supported at the PTO shaft 610.

Specifically, the PTO hydraulic clutch mechanism 650 includes a driving-side member 651 supported in a relatively rotatable manner at the PTO shaft 610, the driving-side member 651 being operatively connected to the input shaft 210 by way of the power transmission gear train 250, as shown in FIG. 3.

More specifically, in the present embodiment, the power transmission gear train 250 includes, in addition to the first and second transmission gears 251, 252, a third transmission gear 253 that engages with the first transmission gear 251, as shown in FIG. 3.

The driving-side member 651 is relatively non-rotatable with respect to the third transmission gear 253. The driving-side member 651 and the third transmission gear 253 are integrally formed in the present embodiment.

Furthermore, the PTO hydraulic clutch mechanism 650 includes a driving-side friction plate 652 provided at the driving-side member 651 in a relatively non-rotatable manner and in a relatively movable manner along the axis line direction; a driven-side member 653 supported in a relatively non-rotatable manner at the PTO shaft 610; a driven-side friction plate 654 provided at the driven-side member 653 in a relatively non-rotatable manner and in a relatively movable manner along the axis line direction, the driven-side friction plate 654 being arranged so as to face the driving-side friction plate 653; and a clutch member 655 for switching friction engagement/disengagement of the driving-side friction plate 652 and the driven-side friction plate 654.

The clutch member 655 includes a piston member 656 for frictionally engaging the driving-side friction plate 652 and the driven-side friction plate 654, and a biasing member 657 for biasing the piston member 656 to a direction away from the driving-side friction plate 652 and the driven-side friction plate 654, where the power is transmitted from the driving-side member 651 to the driven-side friction member 653 when the piston member 656 causes the driving-side friction plate 652 and the driven-side friction plate 654 to be frictionally engaged to each other against the biasing force of the biasing member 657 by the action of the pressurized fluid from the auxiliary hydraulic pump body 510.

Furthermore, the pump unit 100A includes a PTO hydraulic brake mechanism 660 that adds braking force on the PTO shaft in a contradictory manner to the engaging action of the PTO hydraulic clutch mechanism 650, as shown in FIGS. 3 and 5.

That is, the PTO hydraulic brake mechanism 660 is configured to operatively add the braking force to the PTO shaft 610 when the driving-side friction plate 652 and the driven-side friction plate 654 are disengaged, and to release the driving force when the driving-side friction plate 652 and the driven-side friction plate 654 are engaged.

The pump unit 100A has the following configuration to circulate the fluid stored in the housing 110 without arranging additional members.

Figure 6:
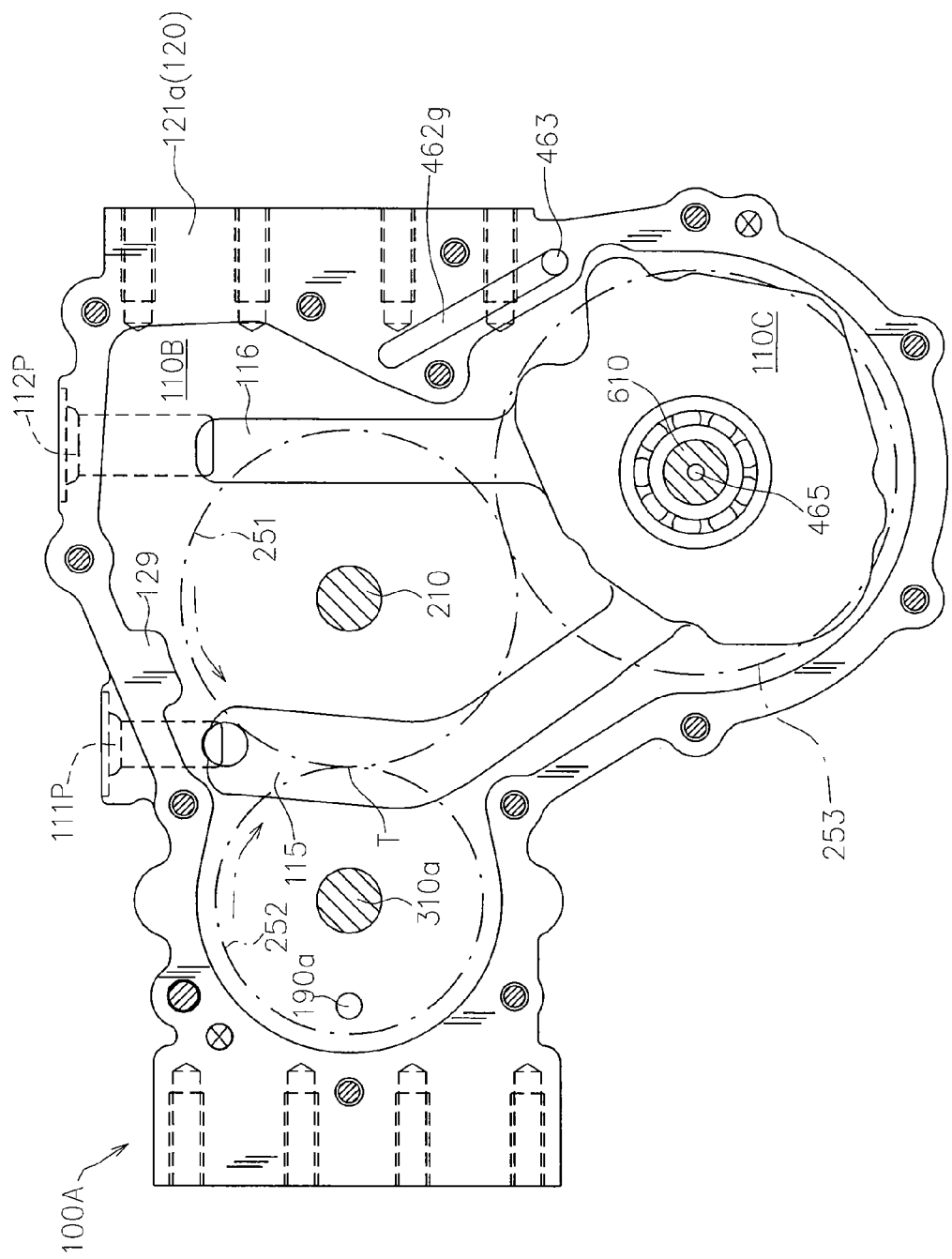
FIG. 6 is an end face view taken along line VI-VI in FIG. 2.

FIG. 6 is an end face view of the first housing portion 121*a* taken along line VI-VI in FIG. 2.

In the pump unit 100A, the inner wall surface of the first gear accommodating region 123*a* defining the gear accommodating space 110B is proximate to one side surface of the first and second transmission gears 251, 252, and the inner wall surface of the second gear accommodating region 123*b* defining the gear accommodating space 110B is proximate to the other side surface of the first and second transmission gears 251, 252, as shown in FIGS. 3 and 4.

As shown in FIG. 6, one of the pair of first and second suction/discharge ports 111P, 112P (first suction/discharge port 111P in the embodiment shown) is arranged in the gear accommodating space 110B so as to be positioned on the side opposite the PTO clutch accommodating space 110C with the engaging point T of the first and second transmission gears 251, 252 in between.

According to such configuration, the suction of the fluid into the PTO clutch accommodating space 110C or the extraction of the fluid from the PTO clutch accommodating space 110C is efficiently performed by utilizing the rotating movement of the first and second transmission gears 251, 252.

That is, in a case where the first suction/discharge port 111P is utilized as the suction port (see FIG. 5), the suction of the fluid through the first suction/discharge port 111P could be promoted by setting the rotating direction of the first and second transmission gears 251, 252 in such a manner that the first suction/discharge port 111P is positioned on the upstream side in the rotating direction of the first and second transmission gears 251, 252 with the engaging point T of the first and second transmission gears 251, 252 as the reference.

On the other hand, in a case where the first suction/discharge port 111P is utilized as the extraction port, the extraction of the fluid through the first suction/discharge port 111P could be promoted by setting the rotating direction of the first and second transmission gears 251, 252 in such a manner that the first suction/discharge port 111P is positioned on the downstream side in the rotating direction of the first and second transmission gears 251, 252 with the engaging point T of the first and second transmission gears 251, 252 as the reference.

As described above, the pump unit 100A is capable of promoting the suction of the fluid into the PTO clutch accommodating space 110C or the extraction of the fluid from the PTO clutch accommodating space 110C with the above configuration, whereby the stored fluid in the PTO clutch accommodating space 110C is efficiently circulated so as to effectively prevent the stored fluid from being retained in the PTO clutch accommodating space 110C.

Accordingly, the cooling efficiency of the PTO clutch mechanism 650 accommodated in the PTO clutch accommodating space 110C could be enhanced.

A first fluid groove 115 is preferably formed in the inner wall surface of the first gear accommodating region 123a so as to extend from the first suction/discharge port 111P to the PTO clutch accommodating space 110C through the engaging point T, as shown in FIGS. 4 and 6.

By providing the first fluid groove 115, the pump action by the first and second transmission gears 251, 252 is more efficiently obtained, whereby the fluid in the PTO clutch accommodating space is more reliably circulated.

More preferably, the first fluid groove 115 extending from the first suction/discharge port 111P to the PTO clutch accommodating space 110C through the engaging point T is also formed in the inner wall surface of the second gear accommodating region 123b, as shown in FIG. 4.

In the embodiment shown, the other one of the pair of first and second suction/discharge ports (second suction/discharge port 112P in the embodiment shown) is also arranged so as to open to the gear accommodating space 110B (see FIG. 6).

The second suction/discharge port 112P is preferably arranged so that extraction or suction of the fluid from the second suction/discharge port 112P is promoted by utilizing the rotating motion of the one of the transmission gears configuring the power transmission gear train 250.

Specifically, the second suction/discharge port 112P is arranged in the vicinity of the outer peripheral edge of one transmission gear (first transmission gear 251 in the embodiment) configuring the power transmission gear train 250.

Since the first suction/discharge port 111P is used as the suction port in the embodiment shown, as described above, the second suction/discharge port 112P is used as the extraction port.

The second suction/discharge port 112P is positioned on the downstream side in the rotating direction of one transmission gear (first transmission gear 251 in the embodiment), whereby the extraction of the fluid stored in the PTO clutch accommodating space 110C through the second suction/discharge port 112P could be promoted by utilizing the pump action of the one transmission gear.

More preferably, a second fluid groove 116 extending from the PTO clutch accommodating region 110C to the second suction/discharge port 112P while facing the outer peripheral edge part of the one transmission gear (first transmission gear 251 in the present embodiment) may be formed at the inner wall surface of the first gear accommodating region 123a and/or the inner wall surface of the second gear accommodating region 123b, as shown in FIGS. 4 and 6.

The pump action by the one transmission gear can be more efficiently obtained by providing the second fluid groove 116.

In the embodiment shown, the second fluid groove 116 is formed at both the inner wall surfaces of the first gear accommodating region 123a and the second gear accommodating region 123b.

More preferably, a partition part 129 may be arranged at the inner peripheral surface of the base housing 120 in order to prevent the fluid from directly flowing between the first suction/discharge port 111P and the second suction/discharge port 112P as much as possible (see FIG. 6).

The first and second suction/discharge ports 111P, 112P are both arranged on the outer peripheral edge of the first transmission gear 251 in the present embodiment, as shown in FIG. 6. Therefore, the partition part 129 is configured so as to be close as much as possible to the outer peripheral edge of the first transmission gear 251 between the first and second suction/discharge ports 111P, 112P.

By arranging the partition part 129, the fluid introduced into the base housing 120 through the first suction/discharge port 111P is effectively prevented from by-passing the PTO clutch accommodating space 110C and discharging through the second suction/discharge port 112P, whereby the circulating efficiency of the fluid stored in the PTO clutch accommodating space 110C could be enhanced.

Furthermore, the pump unit 100A is configured so as to guide the leakage fluid from the first and second hydraulic pump main bodies 320a, 320b to the PTO clutch accommodating space 110C, thereby effectively preventing the leakage fluid from retaining in the pump case 150.

Specifically, a first opening 190a for communicating an internal space of the first pump case 150a to the internal space of the base housing 120 is formed on the end face part 161a of the first case body 150a and the first end wall 122a of the base housing 120, as shown in FIGS. 4 to 6.

Similarly, a second opening 190b for communicating an internal space of the second pump case 150b to the internal space of the base housing 120 is formed on the end face part 161b of the second case body 150b and the second end wall 122b of the base housing 120.

Preferably, the first and second openings 190a, 190b are opened to the gear accommodating space 110B so that the leakage fluid from the first and second pump cases 150a, 150b is efficiently introduced into the PTO clutch accommodating space 110C by utilizing the rotating movement of any one of the transmission gears in the power transmission gear train 250.

In the embodiment shown, the first and second openings 190a, 190b are respectively arranged so as to face one side surface and the other side surface of the second transmission gear 252, so that the leakage fluid flows into the PTO clutch accommodating space 110C through the first fluid groove 115 by utilizing the rotating movement of the second transmission gear 252, as shown in FIG. 6.

Now, the hydraulic fluid supply structure according to the present embodiment applied to the pump unit 100A will be described.

The pump unit 100A includes an external reservoir tank 900 in addition to the above configuration (see FIG. 5). The external reservoir tank 900 forms a fluid reservoir along with the internal space of the housing 110.

The hydraulic fluid supply structure according to the present embodiment is applied to the pump unit so as to supply the pressurized fluid from the auxiliary hydraulic pump body 510 to the PTO hydraulic clutch mechanism 650 and the hydraulic actuator.

That is, the pump unit 100A includes the pair of first hydraulic fluid lines 400a and the pair of second hydraulic fluid lines 400b, a suction line 440 for fluidly connecting the external reservoir tank 900 and a suction port 510in of the auxiliary hydraulic pump body 510, and the hydraulic fluid supply structure according to the present embodiment.

The suction line 440 includes a suction conduit 441 fluidly connected to the external reservoir tank 900 and a suction fluid passage 442 formed in the auxiliary pump case 520, as shown in FIGS. 3 and 5.

The suction fluid passage 442 has a first end opened to the external surface of the auxiliary hydraulic pump case 520 so as to form a suction port 440P, and a second end fluidly connected to the suction port 510in of the auxiliary pump case body 510, as shown in FIGS. 1, 3 and 5.

An oil filter 910 is interposed in the suction line 440, as shown in FIG. 5.

In the present embodiment, the oil filter 910 is mounted to the auxiliary pump case 520 so as to be interposed in the suction fluid passage 442, as shown in FIGS. 3 and 4, thereby alleviating the burden of the piping work and the maintenance work on the working vehicle.

The hydraulic fluid supply structure includes a discharge line 450 fluidly connected to a discharge port 510out of the auxiliary hydraulic pump body 510, an external hydraulic fluid extraction line 470 having a proximal end fluidly connected to the discharge line 450 and a distal end fluidly connected to the hydraulic actuator 75, a PTO hydraulic fluid line 460 having a proximal end fluidly connected to the discharge line 450 and a distal end fluidly connected to the PTO hydraulic clutch mechanism 650, and a PTO switching valve 950 interposed in the PTO hydraulic fluid line 460, as shown in FIG. 5.

Figure 7:
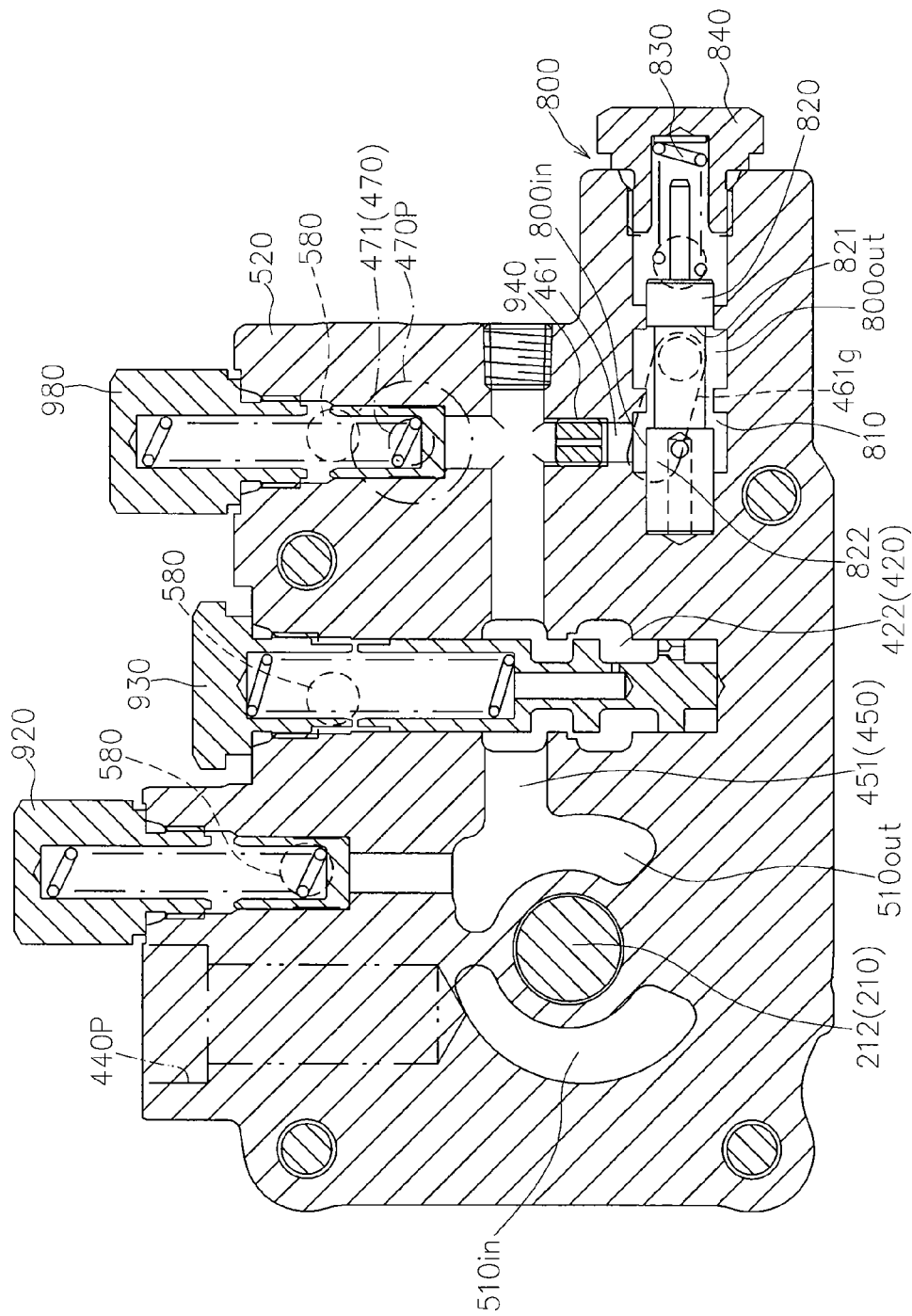
FIG. 7 is a cross sectional view taken along line VII-VII in FIG. 4.

FIG. 7 is a cross sectional view of the auxiliary hydraulic pump case 520 taken along line VII-VII in FIG. 4.

Figure 8:
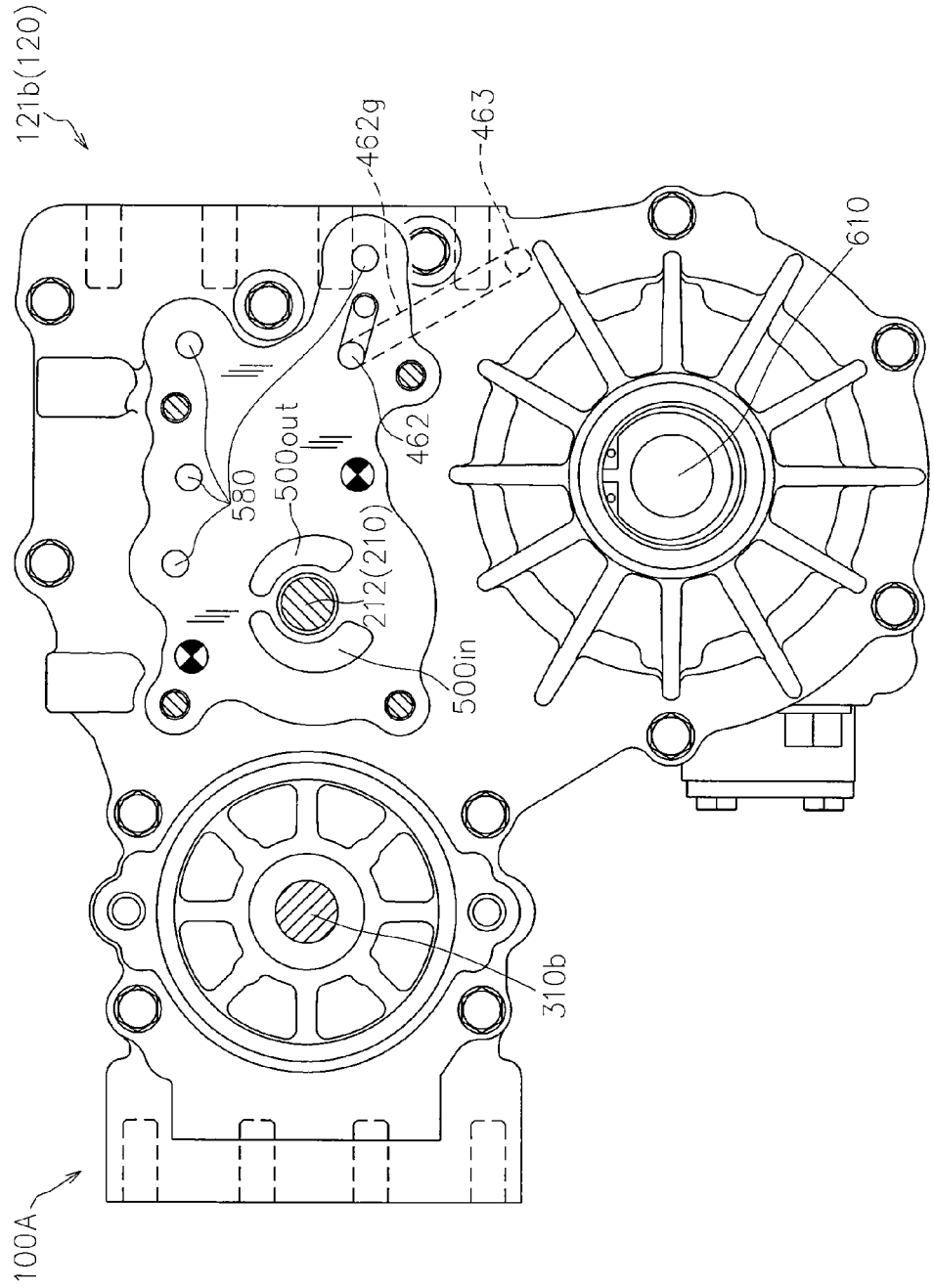
FIG. 8 is an end face view taken along line VIII-VIII in FIG. 4.

FIG. 8 is an end face view of the second housing portion taken along line VIII-VIII in FIG. 4.

The discharge line 450 is regulated so as to have a first pressure value.

In the present embodiment, the discharge line 450 is regulated so as to have the first pressure value by a main relief valve 920, as shown in FIG. 5.

The discharge line 450 includes a discharge fluid passage 451 formed in the auxiliary hydraulic pump case 520, as shown in FIGS. 4, 5, and 7.

The discharge fluid passage 451 has a first end fluidly connected to the discharge port 510out of the auxiliary hydraulic pump body 510.

As shown in FIG. 7, the main relief valve 920 is interposed in the discharge fluid passage 451. The relief fluid from the main relief valve 920 is returned to the fluid reservoir (base housing 120 in this embodiment) (see FIGS. 5 and 7).

The external hydraulic fluid extraction line 470 has a proximal end fluidly connected to the discharge line 450 through a resistance valve 980, and a distal end fluidly connected to a raising and lowering switching valve 76 for controlling supply and discharge of the hydraulic fluid to the hydraulic actuator 75, as shown in FIG. 5.

In the present embodiment, the external hydraulic fluid extraction line 470 includes an external hydraulic fluid extraction fluid passage 471 formed in the auxiliary hydraulic pump case 520, and an external hydraulic fluid extraction conduit 472 having a proximal end fluidly connected to the external hydraulic fluid extraction fluid passage 471 and a distal end fluidly connected to the raising and lowering switching valve 76, as shown in FIG. 5.

The external hydraulic fluid extraction fluid passage 471 is fluidly connected to the discharge fluid passage 451 through the resistance valve 980.

That is, the external hydraulic fluid extraction fluid passage 471 has a proximal end fluidly connected to a secondary side of the resistance valve 980 (see FIGS. 5 and 7), and a distal end opened to the external surface of the auxiliary hydraulic pump case 520 so as to and form an external hydraulic fluid extraction port 470P (see FIGS. 1 and 5).

The reference character 550 in FIGS. 7 and 8 is a drain hole.

The external hydraulic fluid extraction conduit 472 has a proximal end fluidly connected to the external hydraulic fluid extraction port 470P and a distal end fluidly connected to a primary side first port 77a of the raising and lowering switching valve 76.

Specifically, the raising and lowering switching valve 76 includes the primary side first port 77a and a primary side second port 77b, and a secondary side first port 78a and a secondary side second port 78b, as shown in FIG. 5.

In addition to the external hydraulic fluid extraction line 470 fluidly connected to the primary side first port 77a, the working vehicle 1 includes a drain line 475 having a first end fluidly connected to the primary side second port 77b and a second end fluidly connected to the fluid reservoir (external reservoir tank 900 in the embodiment); a return line 476 having a first end fluidly connected to the secondary side first port 78a and a second end fluidly connected to the base housing 120 through the motor housings 12, 22 in the first and second hydraulic motor units 10, 20; and a working machine raising and lowering line 477 having a first end fluidly connected to the secondary side second port 78b and a second end fluidly connected to the hydraulic actuator 75, as the hydraulic circuit for raising and lowering the working machine 75.

The raising and lowering switching valve 76 takes a raising position where the external hydraulic fluid extraction line 470 is fluidly connected to the working machine raising and lowering line 477, a holding position where the working machine raising and lowering line 477 is blocked, and a lowering position where the working machine raising and lowering line 477 is fluidly connected to the drain line 475, based on an external operation.

In the present embodiment, the raising and lowering switching valve 76 is configured so as to fluidly connect the return line 476 and the drain line 475 when positioned at the raising position, and to fluidly connect the external hydraulic fluid extraction line 470 to the return line 476 when positioned at the holding position and the lowering position.

Oil cooler 990 may be preferably interposed in the return line 476, as shown in FIG. 5. According to the configuration, the fluid that has been cooled can be returned to the base housing 120, thereby further enhancing the cooling efficiency of the PTO clutch mechanism 650.

Figure 9:
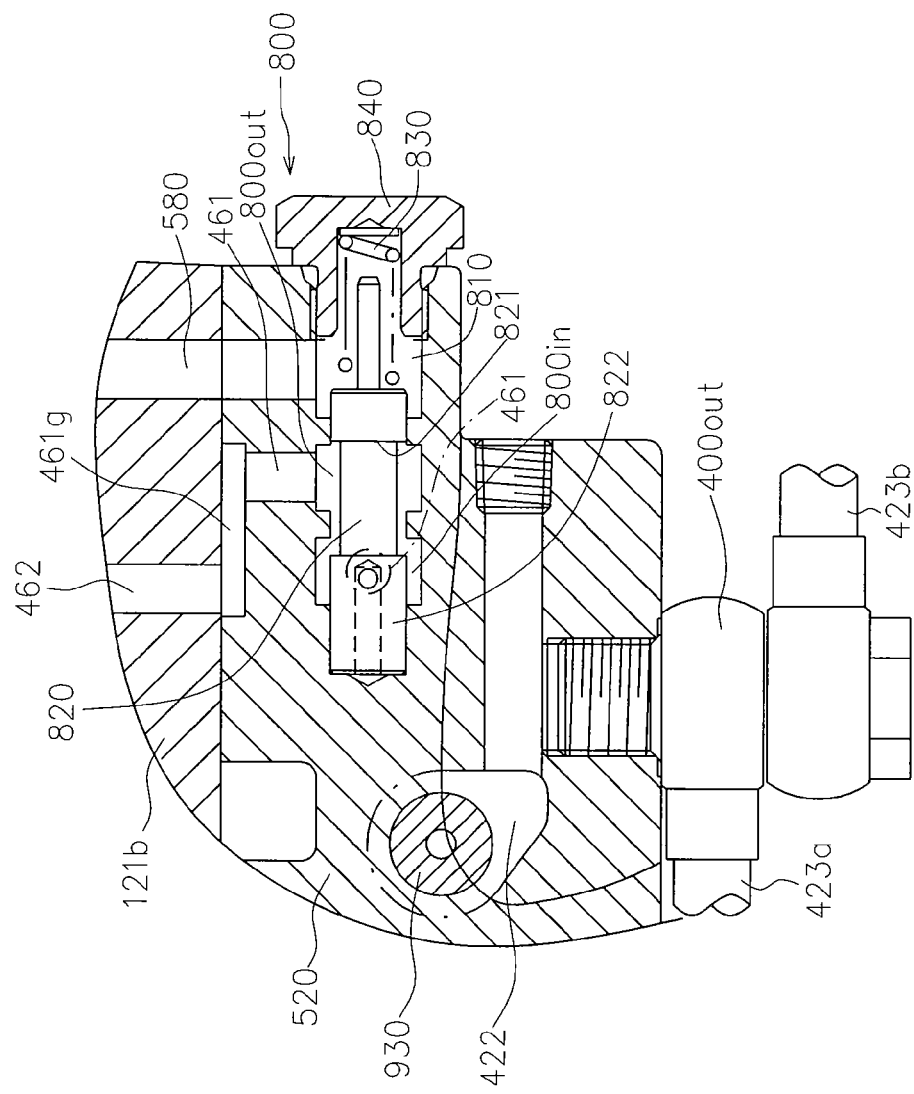
FIG. 9 is a cross sectional view taken along line IX-IX in FIG. 2.
Figure 10:
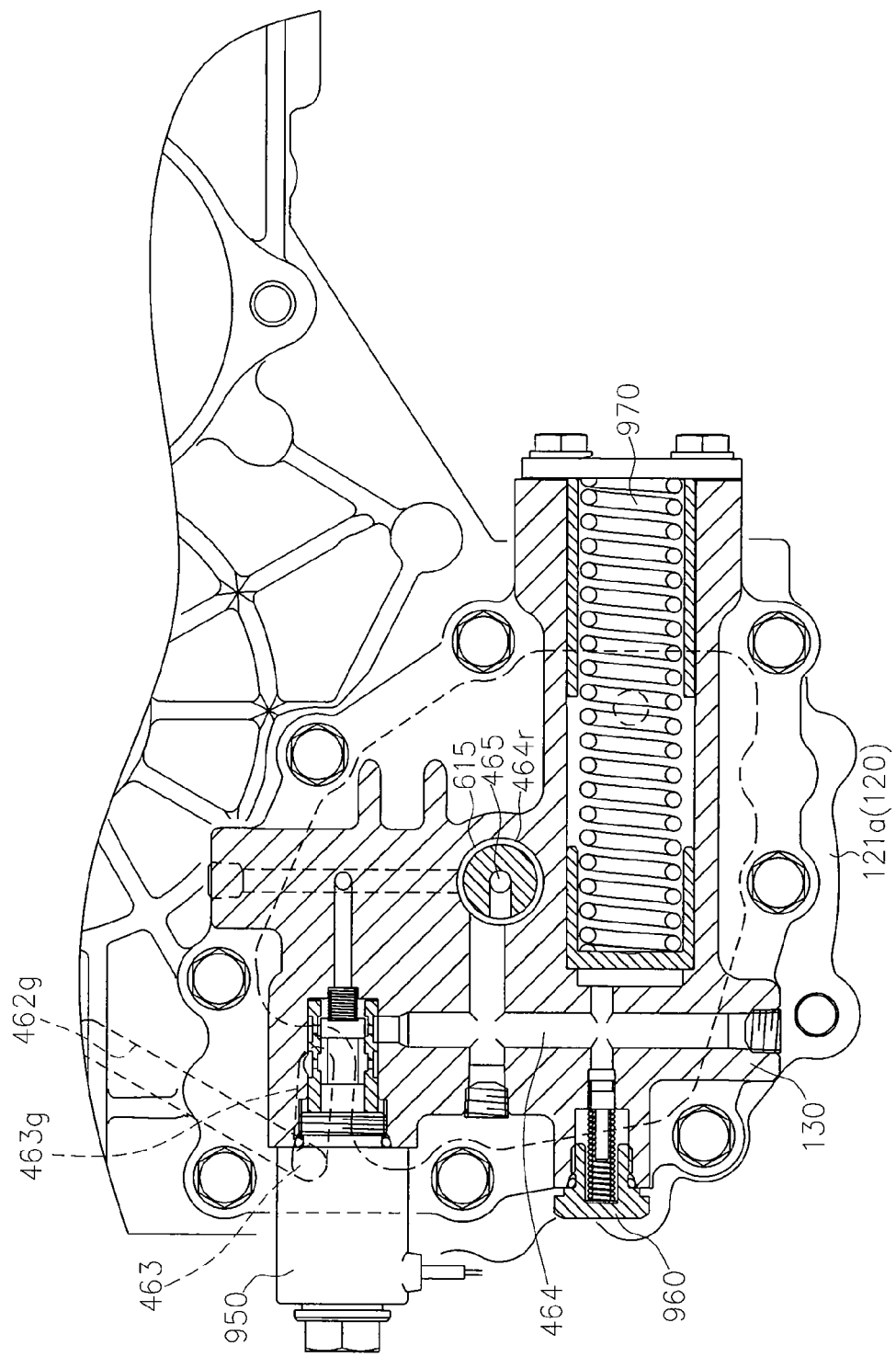
FIG. 10 is a cross sectional view taken along line X-X in FIG. 2.

FIGS. 9 and 10 are cross sectional views taken along line IX-IX and line X-X, respectively, in FIG. 2.

The PTO line 460 has a proximal end fluidly connected to the discharge line 450 through a throttle valve or an orifice 940 and a distal end fluidly connected to the PTO clutch mechanism 650 in a state of being regulated to have a second pressure value lower than the first pressure value.

In the present embodiment, the PTO line 460 is regulated to have the second pressure value by a PTO relief valve 960 (see FIG. 5).

In the present embodiment, the PTO line 460 includes a first PTO fluid passage 461 formed in the auxiliary hydraulic pump case 520, a second PTO fluid passage 462 formed in the second housing portion 121b, a third PTO fluid passage 463 formed in the first housing portion 121a, a fourth PTO fluid passage 464 formed in the lid member 130, and a fifth PTO fluid passage 465 formed in the PTO shaft 610.

The first PTO fluid passage 461 has a first end fluidly connected to the discharge fluid passage 451 through the throttle valve 940, and a second end opened to a joining surface with the second housing portion 121*b*, as shown in FIGS. 2, 7, and 9.

The second PTO fluid passage 462 has a first end opened to a joining surface with the auxiliary hydraulic pump case 520 so as to fluidly connect to the second end of the first PTO fluid passage 461, and a second end opened to a joining surface with the first housing portion 121*a*, as shown in FIGS. 2, 8, and 9.

The third PTO fluid passage 463 has a first end opened to a joining surface with the second housing portion 121*b* so as to fluidly connect to the second end of the second PTO fluid passage 462, and a second end opened to a joining surface with the lid member 130, as shown in FIGS. 2, 3, 8, and 10.

The fourth PTO fluid passage 464 has a first end opened to a joining surface with the first housing portion 121*a* so as to fluidly connect to the second end of the third PTO fluid passage 463, and a second end opened to a bearing hole 615 for supporting the PTO shaft 610, as shown in FIGS. 2, 3, and 10.

The fifth PTO fluid passage 465 has a first end opened to the external surface of the PTO shaft 610 so as to fluidly connect to the second end of the fourth PTO fluid passage 464, and a second end fluidly connected to the PTO hydraulic clutch mechanism 650, as shown in FIGS. 3 and 10.

As described above, the PTO line 460 is configured with the fluid passages formed in the auxiliary pump case 520, the base housing 120, the lid member 130 and the PTO shaft 610, thereby achieving a conduit-less configuration in the present embodiment.

More specifically, the first PTO fluid passage 461 and the second PTO fluid passage 462 are fluidly connected by way of a fluid groove 461*g* formed at the joining surfaces of the auxiliary hydraulic pump case 520 and the second housing portion 121*b* (see FIGS. 2, 7 and 9).

The second PTO fluid passage 462 and the third PTO fluid passage 463 are fluidly connected by way of a fluid groove 462*g* formed at the joining surfaces of the second housing portion 121*b* and the first housing portion 121*a* (see FIGS. 2, 8, 10).

The third PTO fluid passage 463 and the fourth PTO fluid passage 464 are fluidly connected by way of a fluid groove 463*g* formed at the joining surfaces of the first housing portion 121*a* and the lid member 130 (see FIGS. 2, 3 and 10).

The fourth PTO fluid passage 464 and the fifth PTO fluid passage 465 are fluidly connected by way of a rotary joint 464*r* formed at the joining surfaces of the bearing hole 615 and the PTO shaft 610 (see FIGS. 3 and 10).

In the present embodiment, the PTO relief valve 960 is attached to the lid member 130 so as to be interposed in the fourth PTO fluid passage 464, as shown in FIG. 10.

Furthermore, an accumulator 970 is interposed in the PTO hydraulic fluid line 460 in the present embodiment (see FIG. 5).

The accumulator 970 gradually increases the hydraulic pressure of the PTO hydraulic fluid line 460, thereby preventing the driving-side friction plate 652 and the driven-side friction plate 654 from suddenly engaging when the PTO hydraulic clutch mechanism 650 is shifted from the power cutting off state to the power transmitting state.

The accumulator 970 is attached to the lid member 130 so as to be interposed in the fourth PTO fluid passage 464 in the present embodiment, as shown in FIGS. 3 and 10.

The PTO switching valve 950 is interposed in the PTO hydraulic fluid line 460 so as to selectively engage or disengage the supply of hydraulic fluid from the auxiliary hydraulic pump body 510 to the PTO hydraulic clutch mechanism 650, as shown in FIG. 5.

Specifically, the PTO hydraulic clutch mechanism 650 is of a hydraulic operating type in which the driving side and the driven side are frictionally engaged when pressurized fluid is supplied, as described above.

Therefore, the PTO switching valve 950 is configured so as to take an ON position where the PTO hydraulic fluid line 460 is in a communicating state so that the PTO hydraulic clutch mechanism 650 is in the power transmitting state, and an OFF position where the PTO hydraulic fluid line 460 is in a cutting off state so that the PTO hydraulic clutch mechanism 650 is in the power cutting off state, based on a manual operation, as shown in FIG. 5.

In the present embodiment, the PTO switching valve 950 is of a normal-closed type where the primary side of the PTO hydraulic fluid line 460 is blocked when positioned at the OFF position, as shown in FIG. 5.

Specifically, the PTO hydraulic fluid line 460 includes a primary side line 460*f* and a secondary side line 460*s* respectively positioned on the upstream side and the downstream side of the PTO switching valve 950, as shown in FIG. 5.

The primary side line 460*f* has a proximal end fluidly connected to the discharge line 450 and a distal end fluidly connected to a primary side port of the PTO switching valve 950.

The secondary side line 460*s* has a proximal end fluidly connected to a secondary side port of the PTO switching valve 950 and a distal end fluidly connected to the PTO hydraulic clutch mechanism 650, in a state of being regulated to have the second pressure value by the PTO relief valve 960.

The PTO switching valve 950 is configured to fluidly connect the primary line 460*f* to the secondary side line 460*s* when positioned at the ON position, and to block the downstream end of the primary side line 460*f* when positioned at the OFF position.

The secondary side line 460*s* is fluidly connected to a drain line 468 when the PTO switching valve 950 is positioned at the OFF position (see FIG. 5).

The following advantages are obtained by using a normal-closed type valve as the PTO switching valve 950.

That is, power transmission to the working machine is normally disengaged in view of safety etc. (i.e., supply of hydraulic fluid to the PTO hydraulic clutch mechanism 650 is cut off by PTO switching valve 950), when the working machine is raised by the hydraulic actuator 75.

However, in the prior art, the normal-opened type valve is used for the PTO switching valve 950. The normal-opened type valve is configured so as to fluidly connect both the primary side line 460*f* and the secondary side line 460*s* of the PTO hydraulic fluid line 460 to the drain line 469 when cutting off the PTO hydraulic fluid line 460.

That is, in the conventional configuration, the primary side line 460*f* of the PTO hydraulic fluid line 460 is opened to the outside through the drain line 469 when the supply of hydraulic fluid to the PTO hydraulic clutch mechanism 650 is stopped, and thus some of the pressurized fluid in the discharge line 450 fluidly connected with the primary side line 460*f* constantly leaks to the outside through the drain line 469.

Therefore, in the conventional configuration, substantial time is required to increase the fluid amount and the hydraulic pressure of the external hydraulic fluid extraction line 470, and thus a great amount of time is required for raising the working machine.

In the present embodiment, on the other hand, the normal-closed type valve is used as the PTO switching valve 950, so that the primary side line 460ƒ is blocked by the PTO switching valve 950 when the PTO hydraulic fluid line 460 is cut off, as described above.

In the configuration, the pressurized fluid of the discharge line 450 does not flow to the outside when the hydraulic fluid is not supplied to the PTO hydraulic clutch mechanism 650 (when the PTO hydraulic fluid line 460 is cut off).

Therefore, the pressurized fluid can be efficiently supplied to the external hydraulic fluid extraction line 470 fluidly connected to the discharge line 450, whereby it can be rapidly performed to raise the working machine by the hydraulic actuator 75.

Since the pressurized fluid from the auxiliary hydraulic pump body 510 does not flow outside from the PTO hydraulic fluid line 460 in the raising operation of the working machine, the load of the auxiliary hydraulic pump body 510 is also alleviated.

Furthermore, the following configuration is also arranged in the present embodiment to prevent failures that are caused by using the normal-closed type valve as the PTO switching valve 950.

That is, in terms of cost etc., the PTO hydraulic fluid line 460 is preferably configured to withstand the hydraulic pressure necessary in having the PTO hydraulic clutch mechanism 650 in the power transmitting state, that is, the second pressure value set by the PTO relief valve 960.

However, in a case where the normal-closed type valve is used for the PTO switching valve 950, when the raising and lowering switching valve 76 is positioned at the raising position so that the working machine is raised in a state that the PTO switching valve 950 is positioned at the OFF position so that the supply of hydraulic fluid to the PTO hydraulic clutch mechanism 650 is stopped, the hydraulic pressure of the primary side line 460ƒ of the PTO hydraulic fluid line 460 as well as the discharge line 450 and the external hydraulic fluid extraction line 470 raises to the first pressure value set by the main relief valve 920.

Therefore, the hydraulic fluid may leak out from the primary side line 460ƒ, if the PTO hydraulic fluid line 460 is configured only enough to withstand the second pressure value as in the prior art.

On the other hand, if the PTO hydraulic fluid line 460 is configured enough to withstand up to the first pressure value, which is not essentially required, an increased cost results.

In particular, in the present embodiment, the primary side line 460ƒ in the PTO hydraulic line 460 includes the fluid groove 461g formed at the joining surfaces of the auxiliary hydraulic pump case 520 and the second housing portion 121b for fluidly connecting the first and second PTO fluid passages 461, 462; the fluid groove 462g formed at the joining surfaces of the first and second housing portions 121a, 121b for fluidly connecting the second and third PTO fluid passages 462, 463, and the fluid groove 463g formed at the joining surfaces of the first housing portion 121a and the lid member 130 for fluidly connecting the third and fourth PTO fluid passages 463, 464, as described above.

Therefore, a high precision sealing configuration is required for each of the joining surfaces to prevent the hydraulic fluid from leaking out in a case where the primary side line 460ƒ is raised up to the first pressure value.

In view of the above aspects, the hydraulic fluid supply structure according to the present embodiment is configured to cut off the PTO hydraulic fluid line 460 from the discharge line 450, when the hydraulic pressure of the discharge line 450 is higher than the third pressure value, which is lower than the first pressure value but higher than the second pressure value.

Specifically, the hydraulic fluid supply structure includes, in addition to the above configuration, a cut-off valve 800 interposed in the PTO hydraulic fluid line 460, as shown in FIG. 5.

Figure 13:
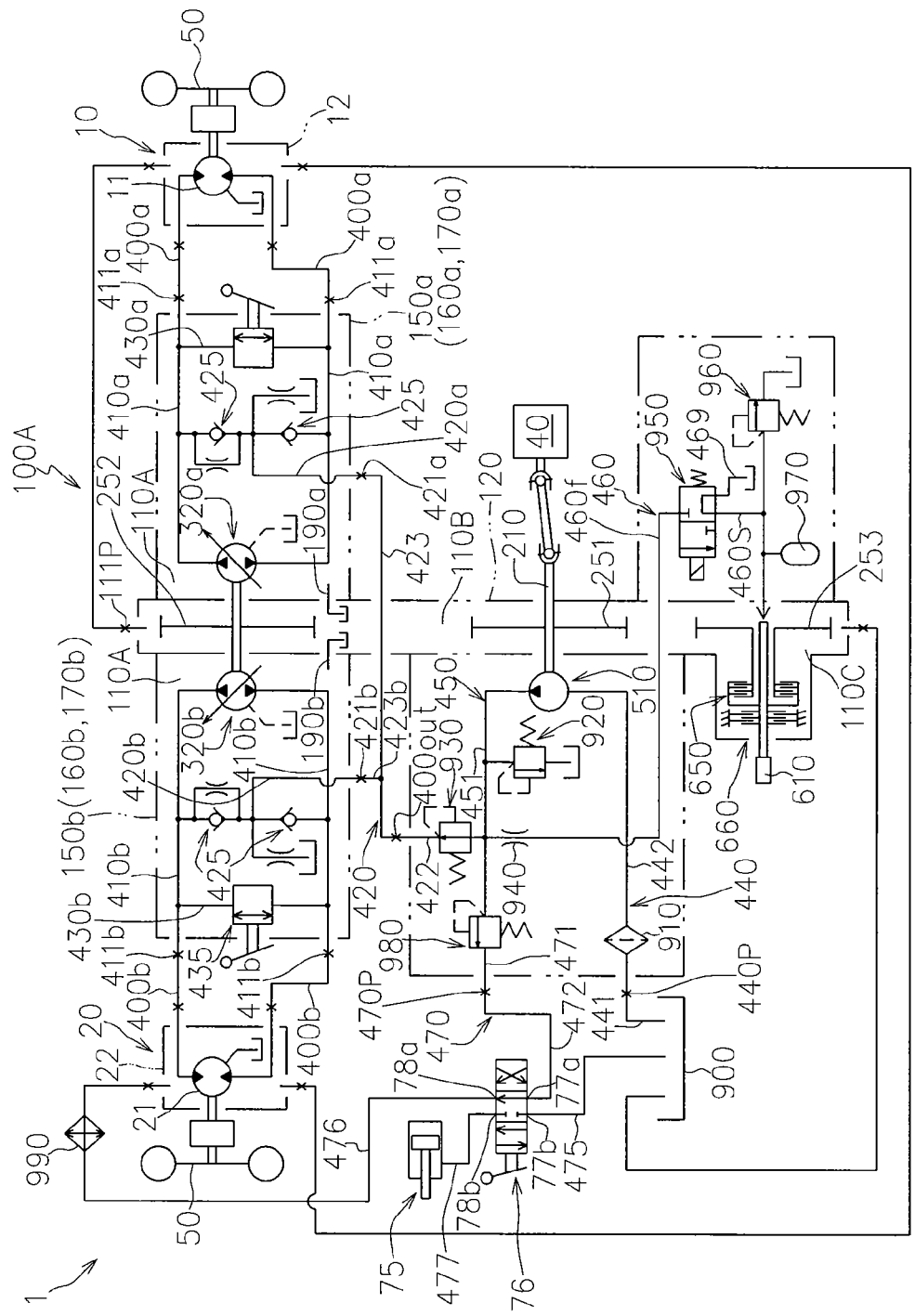
FIG. 13 is a hydraulic circuit diagram of a working vehicle including a pump unit to which a hydraulic fluid supply structure modified from the first embodiment is applied.

For reference, FIG. 13 is a hydraulic circuit diagram of a working vehicle 1 provided with a pump unit to which the hydraulic fluid supply structure according to a modified embodiment is applied. In the modified embodiment, the cut-off valve 800 is omitted.

The cut-off valve 800 is configured to have the PTO hydraulic fluid line 460 communicated or cut off, with the hydraulic pressure of the discharge line 450 as direct or indirect pilot pressure.

According to such configuration, the hydraulic pressure of the primary line 460ƒ on the PTO hydraulic fluid line 460 can be suppressed up to the third pressure value lower than the first pressure value even when the raising and lowering switching valve 76 is positioned at the raising position so that the working machine is raised when the PTO switching valve 950 is at the OFF position so that the supply of hydraulic fluid to the PTO hydraulic clutch mechanism 650 is stopped.

Therefore, the hydraulic fluid is effectively prevented from leaking out from the connecting portion of the fluid passages configuring the PTO hydraulic fluid line 460.

When the PTO switching valve 950 is positioned at the ON position so as to supply the hydraulic fluid to the PTO hydraulic clutch mechanism 650, the PTO hydraulic fluid line 460 is regulated so as to have the second pressure value by the PTO relief valve 960 irrespective of the position of the raising and lowering switching valve 76.

The cut-off valve 800 is preferably positioned as much as possible on the upstream side in the PTO hydraulic fluid line 460, so that the portion having the first pressure value, out of the PTO hydraulic fluid line 460, is reduced as much as possible.

In the present embodiment, the PTO hydraulic fluid line 460 includes the first PTO fluid passage 461 which is formed in the auxiliary hydraulic pump case 520 and in which the throttle valve 940 is interposed, the second PTO fluid passage 462 formed in the second housing portion 121b, the third PTO fluid passage 463 formed in the first housing portion 121a, the fourth PTO fluid passage 464 which is formed in the lid member 130 and in which the PTO switching valve 950 is interposed, and the fifth PTO fluid passage 465 formed in the PTO shaft 610, as described above.

The cut-off valve 800 is attached to the auxiliary hydraulic pump case 520 so as to be interposed in the first PTO fluid passage 461 on the secondary side of the throttle valve 940, as shown in FIG. 7.

According to the configuration, only the second pressure value set by the PTO relief valve 960 applies to the connecting portion 461g of the first and second PTO fluid passages 461, 462 formed at the joining surfaces of the auxiliary hydraulic pump case 520 and the second housing potion 121b, the connecting portion 462g of the second and third PTO fluid passages 462, 463 formed at the joining surfaces of the second housing portion 121b and the first housing portion 121a, and the connecting portion 463g of the third and fourth PTO fluid passages 463, 464 formed at the joining surfaces of the first housing portion 121a and the lid member 130. Therefore, the hydraulic fluid from the PTO hydraulic fluid line 460 is effectively prevented from leaking.

In the present embodiment, the cut-off valve 800 is configured so as to operate with the hydraulic pressure of the secondary side of the throttle valve 940 as the pilot pressure.

Specifically, the cut-off valve 800 includes a valve accommodating space 810 interposed in the first PTO fluid passage 461 so as to have an inlet port 800in opened to the secondary side of the throttle valve 940 and an outlet port 800out opened to the second end (downstream end) of the first PTO fluid passage 461; a valve body 820 accommodated in the valve accommodating space 810 in a movable manner along the axis line direction so as to take a communicating position for fluidly connecting the inlet port 800in and the outlet port 800out and a blocking position for fluidly disconnecting the inlet port 800in and the outlet port 800out; and a biasing member 830 for biasing the valve body 820 towards the communicating position, as shown in FIG. 7.

The valve body 820 includes a pressure receiving part 821 for receiving hydraulic pressure of the secondary side of the throttle valve 940 via the inlet port 800in, and a sealing part 822 configured so as to open the inlet port 800in when positioned at the communicating position and close the inlet port 800in when positioned at the blocking position.

The cut-off valve 800 is configured so that the valve body 820 is positioned at the communicating position when the hydraulic pressure (pilot pressure) of the secondary side of the throttle valve 940 is lower than or equal to the third pressure value defined by the biasing member 830, and is pushed towards the blocking position against the biasing force of the biasing member 830 when the pilot pressure becomes higher than the third pressure value.

Reference character 840 in FIG. 7 indicates a cap member screwed to the auxiliary hydraulic pump case 520 for engaging a proximal end of the biasing member 830 and closing the valve accommodating space 810.

More preferably, the hydraulic fluid supply structure may include a charge line 420 for replenishing the hydraulic fluid to the closed circuit of the HST, as shown in FIG. 5.

The charge line 420 has a proximal end fluidly connected to the discharge line 450 through a pressure reducing valve 930 and distal ends fluidly connected to the pair of first hydraulic fluid lines 400a and the pair of second hydraulic fluid lines 400b through check valves 425, as shown in FIG. 5.

By arranging such charge line 420, it is possible to replenish the hydraulic fluid to the closed circuit without an additional hydraulic pump.

In the present embodiment, the charge line 420 includes a charge discharge fluid passage 422 formed in the auxiliary hydraulic pump case 520 so as to have a proximal end fluidly connected to the discharge fluid passage 451 and a distal end opened to the external surface to form a charge discharge port 400out; the first charge fluid passage 420a formed in the first port block 170a; the second charge fluid passage 420b formed in the second port block 170b; a first charge conduit 423a (see FIGS. 1 to 4) for fluidly connecting the charge discharge port 400out to the first charge port 421a; and a second charge conduit 423b (see FIGS. 1 to 4) for fluidly connecting the charge discharge port 400out to the second charge port 421b, as shown in FIGS. 5 and 7.

As shown in FIG. 7, the pressure reducing valve 930 is attached to the auxiliary hydraulic pump case 520 so as to be interposed in the charge discharge fluid passage 422.

Preferably, the first and second charge conduits 423a, 423b are configured to have their inner diameters defined according to their lengths.

That is, the first port block 170a is positioned on the side opposite the auxiliary hydraulic pump unit 500 with the base housing 120 as the reference, and the second port block 170b is positioned on the same side as the auxiliary hydraulic pump unit 500 with the base housing 120 as the reference, as shown in FIG. 2.

In such configuration, the first charge conduit 423a becomes longer than the second charge conduit 423b.

Therefore, in the present embodiment, the inner diameter of the first charge conduit 423a is larger than that of the second charge conduit 423b, whereby the loss pressure in the charge line 420 is reduced.

Embodiment 2

Another embodiment of the hydraulic fluid supply structure according to the present invention will now be described with reference to the attached drawings.

Figure 11:
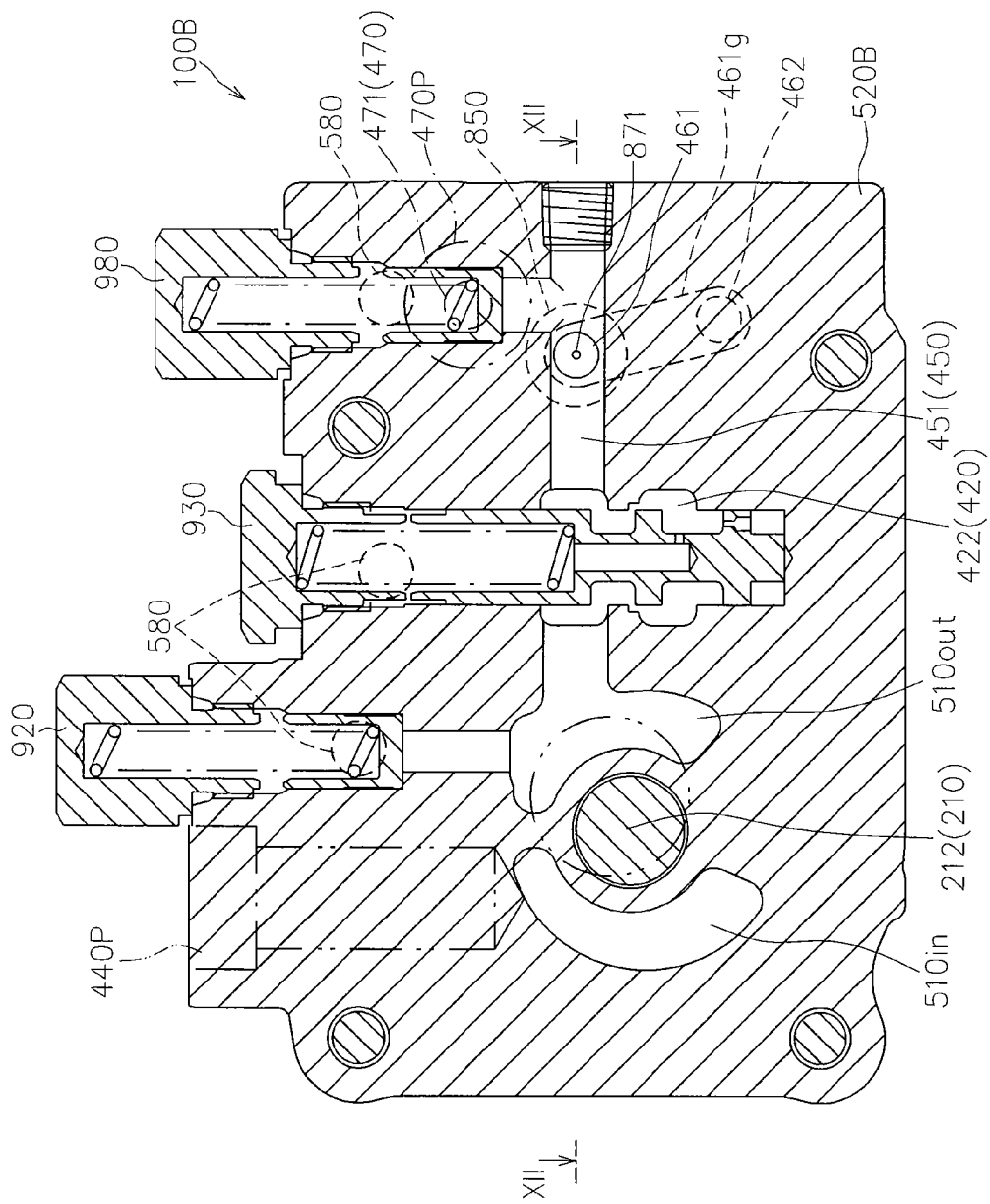
FIG. 11 is a cross-sectional view of an auxiliary hydraulic pump case in a pump unit to which a hydraulic fluid supply structure according to another of the present invention is applied.

FIG. 11 is a cross-sectional view of an auxiliary hydraulic pump case 520B in a pump unit 100B to which a hydraulic fluid supply structure according to the present embodiment is applied.

Figure 12:
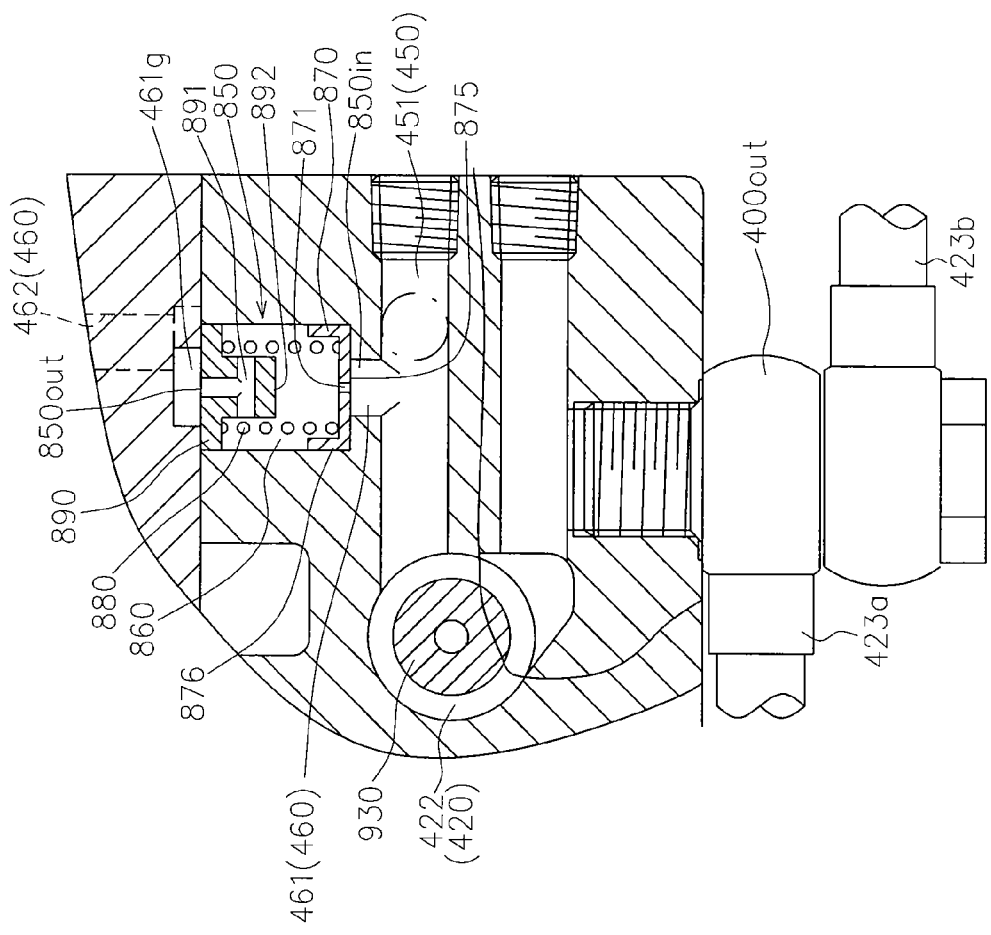
FIG. 12 is a cross-sectional view taken along line XII-XII in FIG. 11.

FIG. 12 is a cross-sectional view taken along line XII-XII in FIG. 11.

In FIGS. 11 and 12, the same reference characters are denoted for the same members as in the embodiment 1, and the detailed explanations thereof are omitted.

The throttle valve 940 performing a throttling function and the cut-off valve 800 performing a cutting-off function are separate from each other in the embodiment 1. On the other hand, the present embodiment is configured so that a single member performs both of the throttling function and the cutting-off function.

That is, the hydraulic fluid supply structure according to the present embodiment includes a throttle valve 850 with the cutting-off function in place of the throttle valve 940 and the cut-off valve 800 in the hydraulic fluid supply structure according to the embodiment 1.

The throttle valve 850 is configured so as to operate with the hydraulic pressure of the discharge line 450 as a pilot pressure, and take a state in which the PTO hydraulic fluid line 460 is fluidly connected to the discharge line 450 through a throttle or an orifice and a state in which the PTO hydraulic fluid line 460 is fluidly disconnected to the discharge line 450.

Specifically, the throttle valve 850 includes a valve accommodating space 860 interposed in the first PTO fluid passage 461 so as to have an inlet port 850in opened to the discharge line 451 and an outlet port 850out opened to the second end (downstream end) of the first PTO fluid passage 461; a valve body 870 having a throttle hole or an orifice hole 871, the valve body 870 being accommodated in the valve accommodating space 860 in a movable manner along the axis line direction so as to take a communicating position for fluidly connecting the inlet port 850in and the outlet port 850out through the throttle hole 871 and a blocking position for fluidly disconnecting the inlet port 850in and the outlet port 850out; a biasing member 880 for biasing the valve body 870 towards the communicating position; and a valve seat member 890 at which the valve body is seated at the blocking position, as shown in FIGS. 11 and 12.

The valve body is accommodated within the valve accommodating space 860 in a movable manner along the axis line direction so as to liquid-tightly divide the valve accommodating space 860 into a primary space fluidly connected to the discharge line 451 and a secondary space fluidly connected to the second end of the first PTO fluid passage 461 in a state of receiving the hydraulic pressure of the discharge line 451.

In the present embodiment, the valve body 870 includes a plate portion as shown in FIG. 12.

The plate portion 870 includes a pressure-receiving portion 875 corresponding to the inlet port 850in, and a seal portion 876 liquid-tightly contacted to an inner surface of the valve accommodating space 860, wherein the throttle hole 871 is provided at the pressure-receiving portion 875.

In the present embodiment, the valve body 870 is provided with a circumferential wall portion extending along the axis line direction from a peripheral edge of the plate portion so that the liquid-tight relationship between the primary space and the secondary space is enhanced.

The valve seat member 890 has a communicating passage 891 for fluidly connecting between the secondary space and the second end of the first PTO fluid passage 461, and closes the secondary space so that the secondary space and the second end of the first PTO fluid passage 461 are fluidly connected to each other only through the communicating passage 891.

Further, the valve seat member 890 has a valve seat portion 892 contacting the plate portion so as to seal the throttle hole 871 when the valve body 870 is positioned at the blocking position.

The biasing member 880 is positioned between the valve body 870 and the valve seat member 890 so as to bias the valve body 870 toward the communicating position.

The throttle valve 850 with the cutting-off function is configured so that the valve body 870 is positioned at the communicating position when the hydraulic pressure of the discharge line 451 is lower than or equal to the third pressure value defined by a resultant force of the hydraulic pressure in the secondary space, which is fluidly connected to the discharge line 451 through the throttle hole 871, and the biasing force of the biasing member 880, whereby the first PTO fluid passage 461 is fluidly connected to the discharge line 451 through the throttle hole 871, the secondary space and the communicating passage 891.

On the other hand, when the hydraulic pressure of the discharge line 451 becomes higher than the third pressure value, the valve body 870 is positioned at the blocking position against the resultant force of the hydraulic pressure in the secondary space and the biasing force of the biasing member 880. At this time, the throttle hole 871 is closed to the valve seat portion 892 of the valve seat member 890. Therefore, the first PTO fluid passage 461 is fluidly disconnected to the discharge line 451.

The thus configured hydraulic fluid supply structure according to the present embodiment could achieve the same effects as in the embodiment 1.

In the above described embodiments, cases where the hydraulic fluid supply structure according to the present invention is applied to the pump units 100A, 100B in which the first and second hydraulic pump main bodies 320a, 320b are arranged in series along the axis line of the pump shafts have been described as examples, but the present invention is not limited thereto. For example, the present invention may be applied to the pump unit in which the first and second hydraulic pump main bodies 320a, 320b are arranged in parallel.

The hydraulic fluid supply structure according to the present invention is obviously also applicable to the pump unit including only one hydraulic pump body or the pump unit including three or more hydraulic pump main bodies, and furthermore, to the HST in which the hydraulic pump body and the hydraulic motor main body are integrally arranged.

This specification is by no means intended to restrict the present invention to the preferred embodiments or modified embodiments set forth therein. Various modifications to the hydraulic fluid supply structure may be made by those skilled in the art without departing from the spirit and scope of the present invention as defined in the appended claims.

What is claimed is:

1. A hydraulic fluid supply structure comprising:
a discharge line fluidly connected to a discharge port of a hydraulic pump body and regulated to have a first pressure value;
an external hydraulic fluid extraction line for supplying the hydraulic fluid to a raising and lowering hydraulic actuator for raising and lowering a working machine, the external hydraulic fluid extraction line being fluidly connected to the discharge line through a resistance valve;
a PTO hydraulic fluid line for supplying the hydraulic fluid to a hydraulic operating type clutch mechanism for engaging or disengaging power transmission to the working machine, the PTO hydraulic line being fluidly connected to the discharge line through a throttle valve;
a PTO relief valve for regulating the pressure of the PTO hydraulic fluid line at a second pressure value lower than the first pressure value; and
a PTO switching valve interposed in the PTO hydraulic fluid line so as to turn ON/OFF the supply of the hydraulic fluid to the hydraulic clutch mechanism;
wherein:
the PTO switching valve is configured to block a primary side line, out of the PTO hydraulic fluid line, positioned on the upstream side from the PTO switching valve, when the supply of hydraulic fluid to the hydraulic clutch mechanism is turned OFF,
the PTO relief valve is interposed in a secondary side line of the PTO hydraulic fluid line positioned on a downstream side from the PTO switching valve,
the throttle valve includes a valve body interposed in the PTO hydraulic fluid line in a movable manner along the axis line direction so as to divide the PTO hydraulic fluid line into a primary space fluidly connected to the discharge line and a secondary space fluidly connected to the PTO switching valve through a throttle hole, a biasing member for biasing the valve body towards the primary space, and a valve seat member, and
the valve body is seated at the valve seat member so that the throttle hole is sealed by the valve seat member when the hydraulic pressure of the discharge line is higher than a third pressure value defined by a resultant force of the hydraulic pressure in the secondary space, which is fluidly connected to the discharge line through the throttle hole, and the biasing force of the biasing member, the third pressure value being lower than the first pressure value and higher than the second pressure value.

2. A hydraulic fluid supply structure according to claim 1, wherein:
the discharge line includes a discharge fluid passage formed in a hydraulic pump case which surrounds the hydraulic pump body;
the PTO hydraulic fluid line includes plurality of PTO fluid passages respectively formed in plurality of case members including the hydraulic pump case, the plurality of PTO fluid passages being fluidly connected to each other in series;
the plurality of PTO fluid passages include one PTO fluid passage formed in the hydraulic pump case so as to have a proximal end fluidly connected to the discharge fluid passage, and another PTO fluid passage formed in another case member separate from the hydraulic pump case, the another PTO fluid passage being fluidly connected to the one PTO fluid passage directly or indirectly, and being configured so that the PTO switching valve is interposed therein; and the throttle valve is mounted at the hydraulic pump case so as to be interposed in the one PTO fluid passage.

3. A hydraulic fluid supply structure according to claim 2, wherein the throttle valve operates with the hydraulic pressure of the upstream side of the throttle valve as the pilot pressure.

4. A hydraulic fluid supply structure comprising:
a discharge line fluidly connected to a discharge port of a hydraulic pump body and regulated to have a first pressure value;
an external hydraulic fluid extraction line for supplying the hydraulic fluid to a raising and lowering hydraulic actuator for raising and lowering a working machine, the external hydraulic fluid extraction line being fluidly connected to the discharge line through a resistance valve;
a PTO hydraulic fluid line for supplying the hydraulic fluid to a hydraulic operating type clutch mechanism for engaging or disengaging power transmission to the working machine, the PTO hydraulic line being fluidly connected to the discharge line through a throttle valve and regulated to have a second pressure value lower than the first pressure value; and
a PTO switching valve interposed in the PTO hydraulic fluid line so as to turn ON/OFF the supply of the hydraulic fluid to the hydraulic clutch mechanism, wherein the PTO switching valve is configured to block a primary side line, out of the PTO hydraulic line, positioned on the upstream side from the PTO switching valve, when the supply of hydraulic fluid to the hydraulic clutch mechanism is turned OFF, and
the PTO hydraulic fluid line is fluidly disconnected from the discharge line when the hydraulic pressure of the discharge line becomes higher than a third pressure value, which is lower than the first pressure value and higher than the second pressure value.

5. A hydraulic fluid supply structure according to claim 4 further comprising a cut-off valve interposed in the PTO hydraulic fluid line, wherein the cut-off valve disconnects the PTO hydraulic fluid line from the discharge line, with the hydraulic pressure of the discharge line as a direct or indirect pilot pressure.

6. A hydraulic fluid supply structure according to claim 5, wherein:
the discharge line includes a discharge fluid passage formed in a hydraulic pump case which surrounds the hydraulic pump body;
the PTO hydraulic fluid line includes plurality of PTO fluid passages respectively formed in plurality of case members including the hydraulic pump case, the plurality of PTO fluid passages being fluidly connected to each other in series;
the plurality of PTO fluid passages include one PTO fluid passage which is formed in the hydraulic pump case so as to have a proximal end fluidly connected to the discharge fluid passage and in which the throttle valve is interposed, and another PTO fluid passage formed in another case member separate from the hydraulic pump case, the another PTO fluid passage being fluidly connected to the one PTO fluid passage directly or indirectly, and being configured so that the PTO switching valve is interposed therein; and
the cut-off valve is mounted at the hydraulic pump case so as to be positioned on a secondary side of the throttle valve.

7. A hydraulic fluid supply structure according to claim 6, wherein the cut-off valve operates with the hydraulic pressure between the throttle valve and the cut-off valve as the pilot pressure.

8. A hydraulic fluid supply structure according to claim 4, further comprising a charge line for replenishing the hydraulic fluid to a closed circuit of an HST, the charge line being fluidly connected to the discharge line through a pressure reducing valve.

* * * * *